(12) United States Patent
Hu et al.

(10) Patent No.: US 11,796,425 B1
(45) Date of Patent: Oct. 24, 2023

(54) MEASUREMENT METHOD FOR PULLOUT FORCE MEASUREMENT TEST DEVICE BASED ON ANCHOR GROUP EFFECT OF MARINE PIPELINE

(71) Applicant: Zhejiang University City College, Zhejiang (CN)

(72) Inventors: Chengbao Hu, Zhejiang (CN); Bing Li, Zhejiang (CN); Gang Wei, Zhejiang (CN); Jiqing Jiang, Zhejiang (CN); Xi Wu, Zhejiang (CN); Zhi Ding, Zhejiang (CN); Bin Chen, Zhejiang (CN); Jianying Yu, Zhejiang (CN); Shuming Su, Zhejiang (CN)

(73) Assignee: Zhejiang University City College, Hangzhou (CN)

( * ) Notice: Subject to any disclaimer, the term of this patent is extended or adjusted under 35 U.S.C. 154(b) by 0 days.

(21) Appl. No.: 18/195,348

(22) Filed: May 9, 2023

(30) Foreign Application Priority Data

Jul. 14, 2022 (CN) .......................... 202210823187.X

(51) Int. Cl.
*G01N 3/40* (2006.01)
*G01M 13/00* (2019.01)
(Continued)

(52) U.S. Cl.
CPC ................................. *G01M 99/007* (2013.01)

(58) Field of Classification Search
CPC ...... G01M 99/00; G01N 2203/00; G01N 3/00
See application file for complete search history.

(56) References Cited

U.S. PATENT DOCUMENTS 3,738,163 A * 6/1973 McEntire .............. G01L 5/0033
  73/761
3,942,368 A * 3/1976 Hoyt ..................... G01L 5/0033
  73/862.584
(Continued)

FOREIGN PATENT DOCUMENTS

CN  104727354 A * 6/2015
CN  205404285 U   7/2016
(Continued)

OTHER PUBLICATIONS

2nd Office Action of counterpart Chinese Patent Application No. 202210823187.X dated Sep. 19, 2022.
(Continued)

*Primary Examiner* — Tran M. Tran

(57) ABSTRACT

Disclosed is a pullout force measurement test device based on an anchor group effect of a marine pipeline, and a measurement method. The test device includes a support frame, a winch, a lifting plate, an upper hanging rope, a force measuring mechanism mounted on the upper hanging rope, two anchor plate mechanisms, and two lower hanging ropes, where each pair of the lower hanging ropes and the anchor plate mechanisms are located on both sides of the upper hanging rope; each anchor plate mechanism includes a model box, a soil sample filled in the model box, an anchor plate embedded in the soil sample, and a pulley assembly used for adjusting a pullout angle of the anchor plate; one end of each lower hanging rope is connected to the lifting plate, and the other end thereof is connected to the anchor plate of the corresponding anchor plate mechanism.

2 Claims, 8 Drawing Sheets

(51) Int. Cl.
*E02D 1/00* (2006.01)
*G01M 99/00* (2011.01)

(56) References Cited

U.S. PATENT DOCUMENTS

| | | | | |
|---|---|---|---|---|
| 3,946,601 | A * | 3/1976 | Yizhaki | E02D 33/00 73/84 |
| 4,359,890 | A * | 11/1982 | Coelus | E02D 33/00 73/84 |
| 4,614,110 | A * | 9/1986 | Osterberg | E02D 33/00 73/84 |
| 4,634,316 | A * | 1/1987 | Cernak | E02D 33/00 405/230 |
| 4,662,227 | A * | 5/1987 | Peterson | G01N 3/00 73/834 |
| 4,753,115 | A * | 6/1988 | Moody | G01L 5/0033 73/862.01 |
| 5,792,961 | A * | 8/1998 | Giebner | G01L 5/0033 73/826 |
| 5,798,981 | A * | 8/1998 | Littlejohn | G01N 29/045 73/594 |
| 6,014,901 | A * | 1/2000 | Boe | G01R 31/69 73/831 |
| 6,752,019 | B2 * | 6/2004 | Horiuchi | G01M 7/025 73/664 |
| 7,175,368 | B2 * | 2/2007 | Stotzer | E02D 33/00 405/232 |
| 7,222,540 | B2 * | 5/2007 | Cross | G01N 3/08 73/826 |
| 7,513,168 | B2 * | 4/2009 | Alba | G01N 3/16 73/818 |
| 7,611,129 | B1 * | 11/2009 | Stahm | E02D 33/00 254/263 |
| 8,069,737 | B2 * | 12/2011 | Hanoun | G01L 5/102 73/862.474 |
| 8,402,837 | B1 * | 3/2013 | Jones | E02D 33/00 73/788 |
| 9,010,195 | B2 * | 4/2015 | Lee | G01M 5/0058 73/826 |
| 9,360,397 | B1 * | 6/2016 | Melton | G01M 99/007 |
| 9,488,558 | B2 * | 11/2016 | Cao | B66D 1/50 |
| 9,645,062 | B2 * | 5/2017 | Gere | G01N 3/08 |
| 9,784,051 | B2 * | 10/2017 | Bergan | E21B 19/006 |
| 9,845,605 | B2 * | 12/2017 | Cao | E04G 3/325 |
| 9,874,503 | B2 * | 1/2018 | Morgan | G01N 3/08 |
| 10,088,387 | B2 * | 10/2018 | Jin | G01M 17/007 |
| 10,345,197 | B2 * | 7/2019 | Ding | G01M 99/007 |
| 10,391,618 | B2 * | 8/2019 | Schwertner | B25C 1/188 |
| 11,353,384 | B2 * | 6/2022 | Guo | G01N 3/06 |
| 11,402,309 | B1 * | 8/2022 | Lai | B63B 21/26 |
| 11,680,884 | B2 * | 6/2023 | Zhang | G01N 3/08 73/37 |
| 11,698,329 | B2 * | 7/2023 | Yang | G01N 33/24 73/856 |
| 11,739,494 | * | 8/2023 | Qin | G01N 33/24 73/866 |
| 2012/0200452 | A1 * | 8/2012 | Jones | E02D 33/00 342/109 |
| 2021/0002847 | A1 * | 1/2021 | Kinjo | E02D 33/00 |
| 2022/0333915 | A1 * | 10/2022 | Chen | G01N 15/1463 |

FOREIGN PATENT DOCUMENTS

| | | | |
|---|---|---|---|
| CN | 106153470 | A | 11/2016 |
| CN | 107476353 | A | 12/2017 |
| CN | 207036118 | U * | 2/2018 |
| CN | 109187170 | A | 1/2019 |
| CN | 111380747 | A | 7/2020 |
| CN | 111535177 | A | 8/2020 |
| CN | 111948046 | A | 11/2020 |
| CN | 112098211 | A | 12/2020 |
| CN | 113405766 | A * | 9/2021 |
| CN | 113686666 | A | 11/2021 |
| CN | 214794188 | U | 11/2021 |
| CN | 113916663 | A | 1/2022 |
| CN | 114892733 | A * | 8/2022 |
| CN | 115655845 | A * | 1/2023 |
| JP | 2003139673 | A | 5/2003 |
| JP | 2014095645 | A | 5/2014 |
| JP | 7199770 | B1 * | 1/2023 |

OTHER PUBLICATIONS

Notice of Allowance of counterpart Chinese Patent Application No. 202210823187.X dated Oct. 11, 2022.

Zhu, Yong et al., Experimental Study on Uplift Behavior of Anchor Plate in Sand, Journal of Central South University (Science and Technology), Jul. 2018, pp. 1768-1774, vol. 49, No. 7.

Ceroni Francesca et al., Pull-Out Tests on Injected Anchors in Tuff Masonry Elements, Key Engineering Materials, Jul. 20, 2017, pp. 326-333, vol. 747.

\* cited by examiner

MEASUREMENT METHOD FOR PULLOUT FORCE MEASUREMENT TEST DEVICE BASED ON ANCHOR GROUP EFFECT OF MARINE PIPELINE

CROSS REFERENCE TO RELATED APPLICATIONS

The present application claims the benefit of Chinese Patent Application No. 202210823187.X filed on Jul. 14, 2022, the contents of which are incorporated herein by reference in their entirety.

TECHNICAL FIELD

The present disclosure relates to the field of anchor plate tests, in particular to a measurement method for a pullout force measurement test device based on an anchor group effect of a marine pipeline.

BACKGROUND

Among the huge amount of marine energy, marine crude oil and marine natural gas dominate. Marine oil and gas resources are transported to land or transfer stations mainly through marine pipelines. Under the multiple effects of ocean currents, waves, and seawater buoyancy, the stability of oil and gas pipelines is the key to ensuring the smooth transportation of oil and gas resources. Marine oil and gas pipelines are characterized by long (longitudinal length), large (diameter), and deep (embedded depth), and are mainly anchored to the bottom of the ocean by means of fixed frames (platforms) and several pairs of anchor plates. Based on the above-mentioned anchoring method, self-weight and complex external loads of the marine oil and gas pipelines are first transmitted to the fixed frames (platforms), then act, by means of the fixed frames (platforms), on the anchor plates arranged in pairs and longitudinally along the pipelines, and are finally extended from anchor plate foundations to submarine foundation beds. In order to effectively evaluate the stability of oil and gas pipelines in complex marine environments, anchoring schemes for oil and gas pipelines under different working conditions are proposed, and it is necessary to develop a force mechanism of the fixed frames (platforms) under an anchor group effect and reveal a deformation and failure mechanism of anchor group foundations in a seabed foundation.

Due to low cost, strong operability and high simulation, an indoor scale model test has become one of the effective means to carry out the above-mentioned research.

It can be seen by checking the published or granted patents that test devices given for an indoor model test of anchor plates mainly include the following types:

patent 1, application number: CN202110789347.9, a visual anchor plate pullout test device including a heavy rainfall-drought extreme climate simulation system is provided, so as to simulate a weakening effect of a horizontal anchor plate foundation under heavy rainfall-drought extreme climate conditions;

patent 2, application number: CN202010750278.6, an anchor plate pullout test device, system and method based on transparent soil are designed to mainly solve a three-dimensional deformation observation problem of surrounding soil during the pullout process of a single vertical anchor plate; and patent 3, application number: CN202111431236.7, an in-plane single anchor pullout failure test device is designed to realize a process simulation of an in-plane force failure of a single anchor plate under different pullout directions.

Although the above-mentioned test devices can realize an anchor plate pullout test under a specific purpose, there are still many deficiencies in terms of marine pipeline type structures based on anchor plate foundations:

(1) a pipeline structure with a large depth is anchored by several pairs of double anchor plates located on the longitudinal sides of the pipelines, and the upper parts of the anchor plates are connected to the fixed frames (platforms). Neither of the existing test devices realizes a pullout process simulation for the double anchor plates, and a pullout force is directly applied to pull rods of the anchor plates, without considering a mutual feedback reaction mechanism between the fixed frames (platforms) and the anchor plates; and (2) the bottom of the ocean is not a flat site, and the embedding depth and angle of paired anchor plate foundations are closely related to specific shape and geological conditions of the seabed. The existing test devices cannot simulate a pullout failure process of the double anchor plates at any embedding depth and inclination angle, and a response law of the anchor plates and the fixed frames (platforms) under the complex embedding conditions.

SUMMARY

On this basis, it is necessary to solve the problem that the existing anchor plate pullout force measurement test devices cannot simulate a pullout failure process of double anchor plates under any embedding depth and inclination angle. According to the measurement method for a pullout force measurement test device based on an anchor group effect of a marine pipeline provided in the present disclosure, a double-anchor plate pullout test can be carried out, so that a failure mode and the law analysis of a pullout resistance under the combined action of double anchor plates is revealed, and an influence law and an exertion process of the double anchor plates on an ultimate pullout force of the anchor plates under the combined action of different embedding depths, embedding angles and relative positions can be obtained, thereby achieving the purpose of guiding the engineering design of the anchor plates.

In order to achieve the above-mentioned object, the present disclosure adopts the technical solutions as follows:

A pullout force measurement test device based on an anchor group effect of a marine pipeline, where the device includes a support frame, a winch mounted on the support frame, a lifting plate located below the winch, an upper hanging rope which connects the winch to the lifting plate, a force measuring mechanism mounted on the upper hanging rope, two anchor plate mechanisms arranged below the lifting plate, and two lower hanging ropes, where each pair of the lower hanging ropes and the anchor plate mechanisms are located on both sides of the upper hanging rope, and are arranged in one-to-one correspondence; each anchor plate mechanism includes a model box, a soil sample filled in the model box, an anchor plate embedded in the soil sample, and a pulley assembly; near side walls close to the lifting plate are provided in the model boxes, and vertical slits are defined on the near side walls; the pulley assemblies are slidably mounted on the near side walls corresponding to the vertical slits; each pulley assembly includes a fixed pulley; one end of each lower hanging rope is connected to the lifting plate, and the other end thereof is connected to the anchor plate of the corresponding anchor plate mechanism; and the lower hanging ropes have a first state and a second state; when the lower hanging ropes are in the first state, the ends of the lower hanging ropes away from the lifting plate are connected to the anchor plates by running through openings on the tops of the model boxes; and when the lower hanging ropes are in the second state, the ends of the lower hanging ropes away from the lifting plate are connected to the anchor plates after winding around the pulley assemblies and running through the vertical slits.

According to the pullout force measurement test device based on an anchor group effect of a marine pipeline of the present disclosure, two model boxes are provided, two anchor plates are respectively embedded in soil samples in the model boxes, a winch, a lifting plate and an upper hanging rope that connects the winch to the lifting plate are then provided, two lower hanging ropes are connected to the lifting plate, and a vertical slit is defined and a pulley assembly that can slide relative to a near side wall is mounted on the near side wall of each model box close to the lifting plate. During the test, the winch can apply a pullout force respectively to the anchor plates placed in the two model boxes by means of the upper hanging rope, the lifting plate and the two lower hanging ropes, so as to realize a pullout test of double anchor plates; moreover, angles between the lower hanging ropes close to the anchor plates and a horizontal line can be adjusted combined with the vertical slits of the model boxes and the slidable pulley assemblies, so as to realize the pullout of the anchor plates at any angle within the range of 0°-90°. Thus, according to the test device of the present disclosure, a pullout force measurement test of double anchor plates can be carried out, so that a failure mode and the law analysis of a pullout force under the combined action of the double anchor plates are revealed, and an influence law and an exertion process of the double anchor plates on an ultimate pullout force of the anchor plates under the combined action of different embedding depths, embedding angles and relative positions can be obtained, thereby achieving the purpose of guiding the engineering design of the anchor plates. In addition, the test device of the present disclosure is further simple in structure and low in cost.

In one of the embodiments, the support frame includes a support top plate, support foot plates and support rods, where the support top plate is defined with a rope hole, and the upper hanging rope runs through the rope hole; the support foot plates are located below the support top plate, the number of the support rods is equal to that of the support foot plates, and the support rods and the support foot plates are arranged in one-to-one correspondence; one end of each of the support rods is connected to the support top plate, and the other end of each of the support rods is connected to the corresponding support foot plates.

In one of the embodiments, the center line of the upper hanging rope and the center lines of the two lower hanging ropes are located on the same plane.

In one of the embodiments, each model box is provided with a lateral camera and a laser displacement sensor, where the lateral cameras are used for capturing the deformation of the upper surfaces of the soil samples during the winding process of the winch, and the laser displacement sensors are used for capturing the displacement of the upper surfaces of the soil samples during the winding process of the winch.

In one of the embodiments, each model box further has a front wall, which is made of a transparent material; and a front camera is arranged in front of each front wall for capturing lateral deformation of the soil samples.

In one of the embodiments, the lifting plate is provided with two lower rope connection points, which are arranged symmetrically about the center line of the lifting plate, and the two lower hanging ropes are respectively connected to the two lower rope connection points.

A measurement method for a pullout force measurement test device based on an anchor group effect of a marine pipeline, where the method is based on the above-mentioned pullout force measurement test device based on an anchor group effect of a marine pipeline, and includes specific measurement steps as follows:

S1, mounting a support frame on a test site;

S2, mounting a winch on the support frame;

S3, mounting a force measuring mechanism on an upper hanging rope, and connecting a center of a lifting plate to the winch by means of the upper hanging rope, where the lifting plate is provided with two lower rope connection points, which are symmetrical about a center line of the lifting plate;

S4, presetting a horizontal distance $t_{cp}$ from fixed pulleys of two pulley assemblies to the corresponding lower rope connection points of the lifting plate, and placing, according to the preset horizontal distance $t_{cp}$, two model boxes defined with vertical slits and mounted with the pulley assemblies on the test site in good positions;

S5, predetermining a pre-embedded depth $h_4$, a pre-pullout angle θ, and a pre-embedded horizontal distance $t_{sb}$ from an inner side wall of the near side wall of each anchor plate in the corresponding model box, predetermining a filling height $h_3$ of soil samples, and measuring a thickness $t_b$ of the near side wall corresponding to each anchor plate, a horizontal distance tbc from the centers of the fixed pulleys to the near side walls, a radius R of the fixed pulleys, a vertical distance $h_1$ from upper edges of the model boxes to the lower rope connection points of the lifting plate, a clear height $h_2$ of the model boxes, and a vertical distance $h_c$ from the centers of the fixed pulleys to the upper edges of the model boxes, where the pre-pullout angle θ of the anchor plates is an angle between the lower hanging ropes close to the anchor plates and a horizontal line; and according to the formula:

$$\theta' = \arccos\left(\frac{RT}{Ht_{cp} - h_1 - RT}\right),$$

calculating a critical angle θ' at which each lower hanging rope needs to wind around the pulley assemblies, where θ' is an angle between the lower hanging ropes and the horizontal line when the lower rope connection points of the lifting plate, the anchor plates, and contact points of the fixed pulleys and the lower hanging ropes are on the same straight line, where $$H = h_1 + h_2 - h_3 + h_4 - \frac{t_a}{2};$$

where when θ is greater than θ' and less than 90°, the lower hanging ropes do not need to wind around the fixed pulleys; and when θ is greater than or equal to 0° and less than or equal to θ', the lower hanging ropes need to wind around the fixed pulleys;

S6, calculating the length of the lower hanging ropes according to the data obtained in step S5, and if the lower hanging ropes need to wind around the fixed pulleys, further calculating the vertical distance from the centers of the fixed pulleys to the upper edges of the model boxes, and sliding the fixed pulleys to corresponding positions for fixing;

S7, providing two lower hanging ropes of a required length according to a calculation result in step S6, where the two lower hanging ropes and the model boxes are arranged in one-to-one correspondence, connecting one end of each of the two lower hanging ropes to a respective one of the two lower rope connection points of the lifting plate, and according to a comparison result of the pre-pullout angle θ and the corresponding critical angle θ', directly connecting the other ends of the two lower hanging ropes to the corresponding anchor plates without running through the vertical slits of the corresponding model boxes, or connecting the other ends of the two lower hanging ropes to the corresponding anchor plates after winding around the fixed pulleys and running through the vertical slits;

S8, filling the soil samples into the model boxes, and when the filling height is equal to the pre-embedded depth $h_4$ of the anchor plates, placing the anchor plates into specified positions on the surfaces of the soil samples according to the pre-embedded depth $h_4$ and the pre-embedded horizontal distance $t_{sb}$ and fixing the anchor plates, and then continuing to fill the soil samples into the model boxes until the soil samples are filled to the specified height;

S9, providing transparent front walls for the model boxes, mounting a lateral camera and a laser displacement sensor on each model box, and arranging a front camera directly in front of the front wall of each model box;

S10, starting the winch to load, and turning on the lateral cameras and the front cameras to capture the deformation of the soil samples.

In one of the embodiments, in step S6, the calculation of the length of the lower hanging ropes by the following formulae specifically involves:

when θ is greater than θ' and less than 90°, the length of the lower hanging ropes is:

$$L=\sqrt{T^2+H^2};$$

when θ is greater than or equal to 0° and less than or equal to θ', the vertical distance from geometric centers of the fixed pulleys to the upper edges of the model boxes is:

$$h_c = h_2 - h_3 + h_4 - (T - t_{cp})\tan\theta_a - \frac{R}{\cos\theta_a};$$

the length of the lower hanging ropes from the centers of the anchor plates to tangent points of lower edges of the fixed pulleys is:

$$L_a = \frac{T - t_{cp}}{\cos\theta_a} + R\tan\theta_a;$$

the length of the lower hanging ropes from the tangent points of the fixed pulleys to an angular point of the lifting plate is:

$$L_b = \frac{h_l + h_c}{\sin\theta_b} + R\cot\theta_b;$$

thus, the length of the lower hanging ropes is:

$$L = L_a + L_b = \frac{T - t_{cp}}{\cos\theta_a} + R\tan\theta_a + \frac{h_l + h_c}{\sin\theta_b} + R\cot\theta_b;$$

and when θ is equal to 90°, the length of the lower hanging ropes is:
L=H;

$$H = h_1 + h_2 - h_3 + h_4 - \frac{t_a}{2},$$

where $$\theta' = \arccos\left(\frac{RT}{Ht_{cp} - h_1 - RT}\right);$$

$T = t_{sb} + t_b + t_{bc} + t_{cp}$;

in the above-mentioned formulae:

$h_1$ is the vertical distance from the upper edges of the model boxes to the lower rope connection points where the lifting plate is connected to the lower hanging ropes;

$h_2$ is the clear height of the model boxes, excluding the thickness of bottom plates of the model boxes;

$h_3$ is the filling height of the soil samples;

$h_4$ is the embedded depth of the anchor plates;

$h_c$ is the vertical distance from the geometric centers of the fixed pulleys to the upper edges of the model boxes;

H is a vertical distance from center points of the anchor plates to a horizontal plane where the lower rope connection points of the lifting plate are located;

T is a horizontal distance from the lower rope connection points of the lifting plate to geometric centers of the anchor plates;

$t_a$ is a thickness of the anchor plates;

θ is the angle between the lower hanging ropes and the horizontal line;

$\theta_a$ is an angle between the lower hanging ropes, which are located below the fixed pulleys, and the horizontal line when the fixed pulleys are used;

$\theta_b$ is an angle between the lower hanging ropes, which are located above the fixed pulleys, and the horizontal line when the fixed pulleys are used;

θ' is an angle between the lower hanging ropes and the horizontal line when the lower rope connection points of the lifting plate, the geometric centers of the anchor plates, and the contact points between the fixed pulleys and the lower hanging ropes are on the same straight line;

$t_{sb}$ is the horizontal distance from the geometric centers of the anchor plates to the inner sides of the near side walls of the model boxes;

$t_b$ is the thickness of the near side walls of the model boxes;

$t_{cp}$ is the horizontal distance from the center points of the fixed pulleys to the lower rope connection points of the lifting plate;

$t_{bc}$ is the horizontal distance from the centers of the fixed pulleys to outer surfaces of the near side walls of the model boxes; and R is the radius of the fixed pulleys;

where $h_1$, $h_2$, $t_a$, $\theta_b$, $t_b$, $t_{bc}$, $t_{cp}$ and R are all obtained by means of measurement, while θ, $\theta_a$, $h_3$, $h_4$ and $t_{sb}$ are data preset according to test needs.

In one of the embodiments, after step S10, a step is further included:

S11, reading, by the force measuring mechanism, a traction force applied by the winch during the test, and respectively calculating pullout forces received by the two lower hanging ropes.

In one of the embodiments, the two lower hanging ropes are defined as a first lower hanging rope and a second lower hanging rope, respectively, and then a pullout force $F_1$ received by the first lower hanging rope and a pullout force $F_2$ received by the second lower hanging rope are calculated by the following formulae:

if the lifting plate remains horizontal, it is concluded that:
the pullout force $F_1$ received by the first lower hanging rope is:

$$F_1 = \frac{F\cos\theta_2}{\sin(\theta_1 + \theta_2)};$$

the pullout force $F_2$ received by the second lower hanging rope is:

$$F_2 = \frac{F\cos\theta_1}{\sin(\theta_1 + \theta_2)};$$

if the lifting plate is tilted with left side up and right side down, it is concluded that:
the pullout force received by the first lower hanging rope is:

$$F_1 = \frac{F[\cos\alpha - \sin\alpha\tan(\theta_2 - \alpha)]}{\sin(\theta_1 + \alpha) + \cos(\theta_1 + \alpha)\tan(\theta_2 - \alpha)};$$

the pullout force received by the second lower hanging rope is:

$$F_2 = \frac{F[\cos\alpha + \sin\alpha\tan(\theta_1 + \alpha)]}{\sin(\theta_2 - \alpha) + \cos(\theta_2 - \alpha)\tan(\theta_1 + \alpha)};$$

and
if the lifting plate is tilted with left side down and right side up, it is concluded that:
the pullout force received by the first lower hanging rope is:

$$F_1 = \frac{F(\cos\alpha - \sin\alpha\tan(\theta_2 - \alpha))}{\sin(\theta_1 + \alpha) + \cos(\theta_1 + \alpha)\tan(\theta_2 - \alpha)};$$

the pullout force received by the second lower hanging rope is:

$$F_2 = \frac{F(\cos\alpha + \sin\alpha\tan(\theta_1 + \alpha))}{\sin(\theta_2 - \alpha) + \cos(\theta_2 - \alpha)\tan(\theta_1 - \alpha)};$$

where $$\alpha = \arcsin\frac{h_i}{L_i};$$

in the above-mentioned formulae:

$\alpha$ is an angle at which the lifting plate is tilted;

F is a measured value of the force measuring mechanism;

$L_t$ is a vertical distance from the lower rope connection points of the lifting plate to the center line of the lifting plate; and $h_t$ is a projection distance of half of the lifting plate on a plumb line after the lifting plate is tilted;

when the first lower hanging rope does not wind around one fixed pulley, $\theta_1$ is an angle between the first lower hanging rope and the horizontal line; and when the first lower rope winds around the fixed pulley, $\theta_1$ is an angle between the first lower hanging rope, which is located above the fixed pulley, and the horizontal line;

when the second lower hanging rope does not wind around the other fixed pulley, $\theta_2$ is an angle between the second lower hanging rope and the horizontal line; and when the second lower rope winds around the fixed pulley, $\theta_2$ is an angle between the second lower hanging rope, which is located between the fixed pulley and the lifting plate, and the horizontal line;

F is measured by the force measuring mechanism; $L_t$ and $h_t$ are obtained by means of measurement; when the first lower hanging rope does not wind around one fixed pulley, $\theta_1$ is an angle preset according to test needs, and when the first lower hanging rope winds around the fixed pulley, $\theta_1$ is obtained by means of measurement; and when the second lower hanging rope does not wind around the other fixed pulley, $\theta_2$ is an angle preset according to test needs, and when the second lower hanging rope winds around the fixed pulley, $\theta_2$ is obtained by means of measurement.

According to the measurement method for a pullout force measurement test device based on an anchor group effect of a marine pipeline of the present disclosure, by means of close combination of the two lower hanging ropes and the cooperation between the pulley assemblies and the vertical slits during the test, the influence of different embedding angles at the same relative position on the bearing capacity of the two anchor plates can be simulated, and the influence of the same embedding angle at different relative positions on the bearing capacity of the two anchor plates can also be simulated, thereby achieving the purpose of guiding the engineering design of the anchor plates.

In addition, the front walls of the two model boxes are set to be made of a transparent material and positioning mark points are preset, lateral cameras and laser displacement sensors are mounted on the near side walls, and front cameras are arranged directly in front of the front walls, so that movement trajectories of the anchor plates and deformation and failure forms of the soil samples can be captured accurately in real time.

BRIEF DESCRIPTION OF THE PULLOUTS

Figure 12:
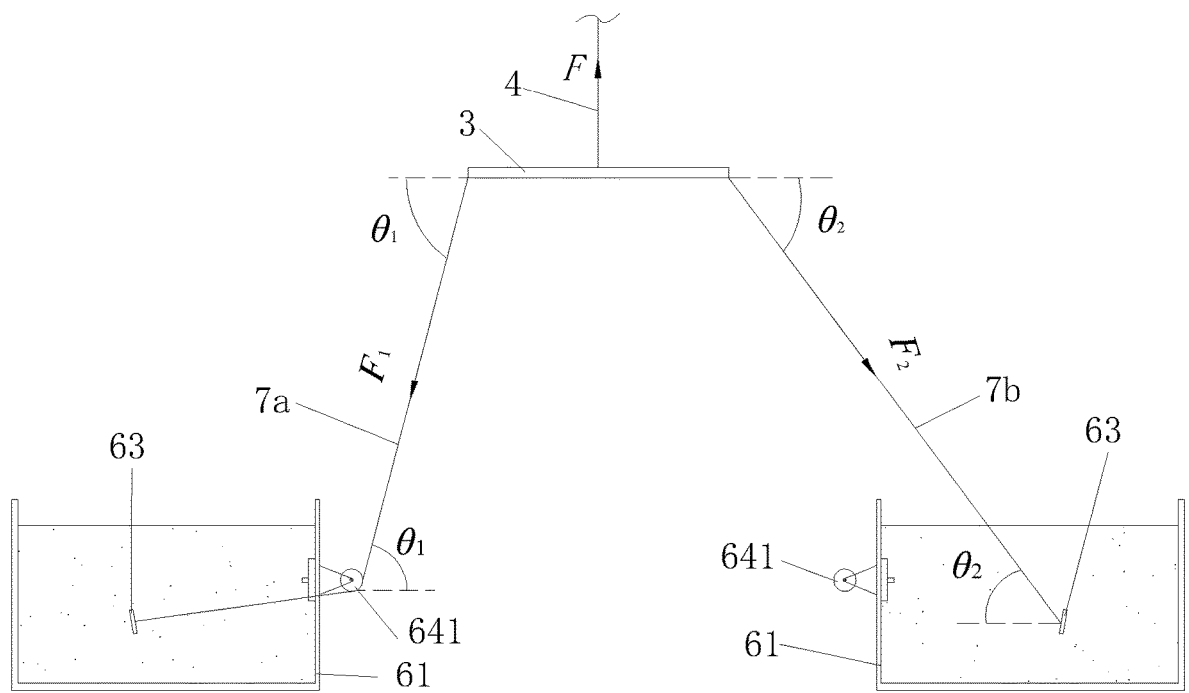
FIG. 12 is a local schematic diagram of the pullout force measurement test device based on an anchor group effect of a marine pipeline according to one of the embodiments when the first lower hanging rope winds around one fixed pulley but the second lower hanging rope does not wind around the other fixed pulley, and the lifting plate remains horizontal.
Figure 14:
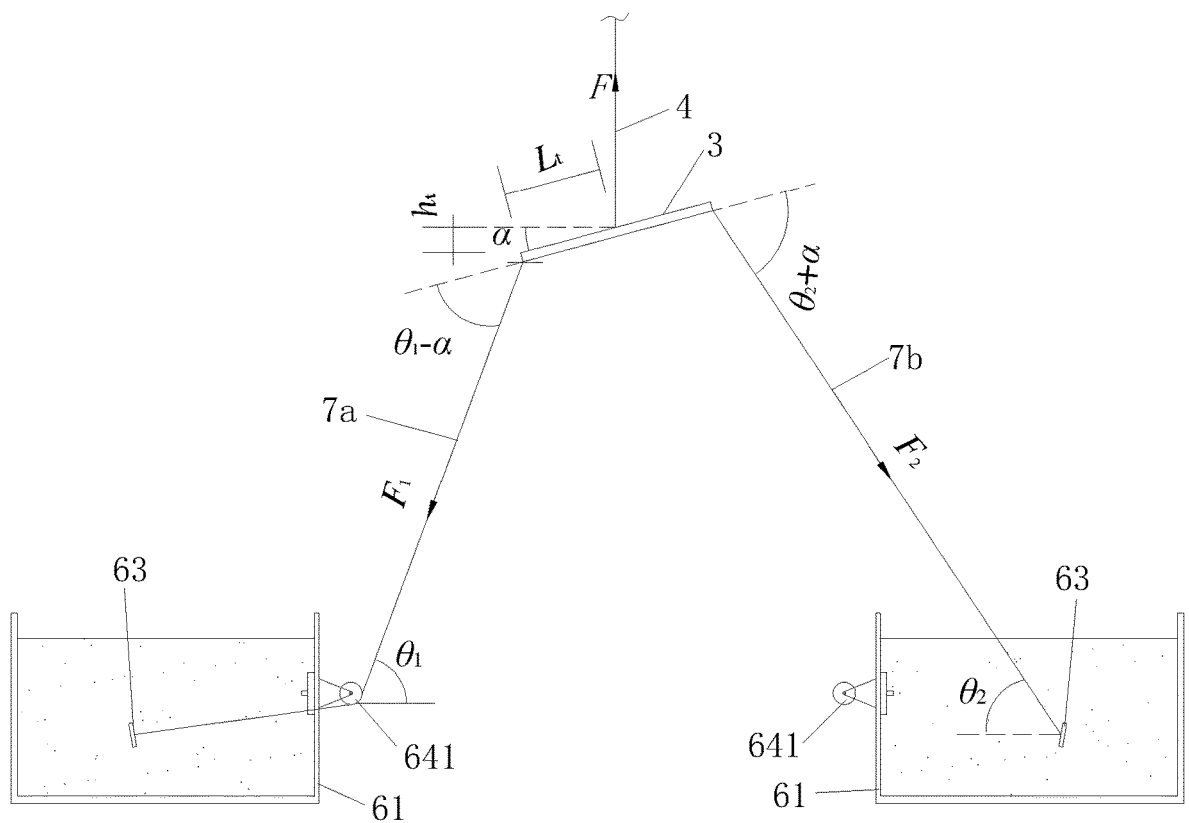
Figure 15:
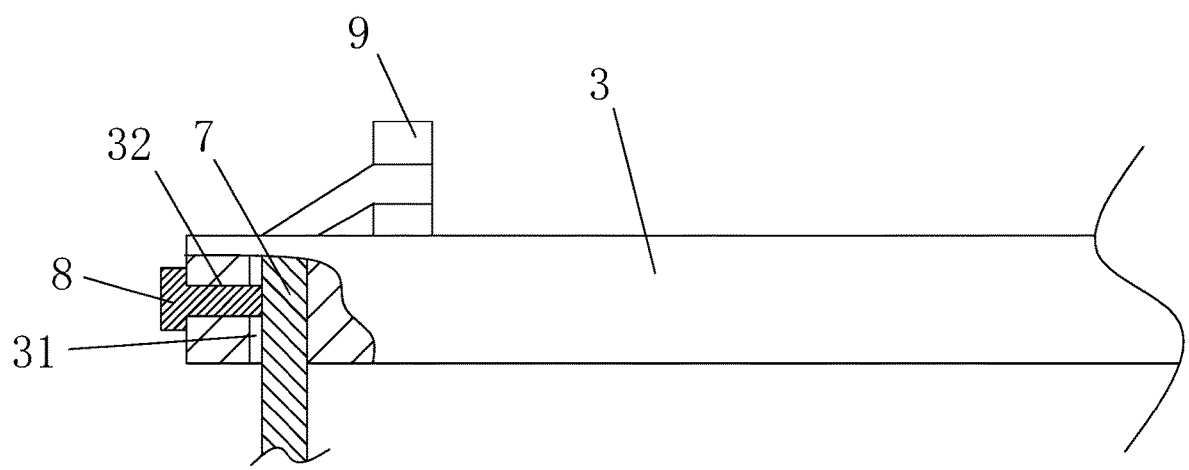

FIG. 14 is a local schematic diagram of the pullout force measurement test device based on an anchor group effect of a marine pipeline shown in FIG. 12 when the first lower hanging rope winds around one fixed pulley but the second lower hanging rope does not wind around the other fixed pulley, and the lifting plate is in the state of left side down and right side up; and FIG. 15 is a local schematic diagram of the pullout force measurement test device based on an anchor group effect of a marine pipeline, with the lower hanging ropes located between the anchor plates and the lifting plates in the present disclosure having an adjustable length.

In the figures: 1, support frame; 11, support top plate; 111, rope hole; 12, support foot plate; 13, expansion nut; 14, support rod; 15, base; 2, winch; 3, lifting plate; 31, vertical square perforation; 32, fastening hole; 4, upper hanging rope; 5, force measuring mechanism; 61, model box; 611, near side wall; 612, vertical slit; 613, vertical sliding track; 62, soil sample; 63, anchor plate; 64, pulley assembly; 641, fixed pulley; 7, lower hanging rope; 7a, first lower hanging rope; 7b, second lower hanging rope; 8, fastening bolt; and 9, rope collecting post.

DETAILED DESCRIPTION

The present disclosure is described in detail below in conjunction with accompanying pullout.

In order to make the purpose, technical solutions and advantages of the present disclosure clearer, the present disclosure will be described in further detail below in conjunction with the accompanying pullouts and embodiments. It should be understood that the specific embodiments described herein are only used to explain the present disclosure but not intended to limit the present disclosure.

Embodiment 1

Referring to FIG. 1 to FIG. 15, provided is a pullout force measurement test device based on an anchor group effect of a marine pipeline according to the embodiments of the present disclosure. Pullout force measurement tests of two anchor plates can be realized, and the device includes a support frame 1, a winch 2 mounted on the support frame 1, a lifting plate 3 located below the winch 2, an upper hanging rope 4 which connects the winch 2 to the lifting plate 3, a force measuring mechanism 5 mounted on the upper hanging rope 4, two anchor plate mechanisms arranged below the lifting plate 3, and two lower hanging ropes 7. Each pair of the lower hanging ropes 7 and the anchor plate mechanisms are located on both sides of the upper hanging rope 4, and are arranged in one-to-one correspondence. Each anchor plate mechanism includes a model box 61, a soil sample 62 filled in the model box 61, an anchor plate 63 embedded in the soil sample 62, and a pulley assembly 64 that is slidably arranged relative to the model box 61. Near side walls 611 close to the lifting plate 3 and parallel to the upper hanging rope 4 are provided in the model boxes 61, and vertical slits 612 are defined on the near side walls 611. The pulley assemblies are mounted on the near side walls 611 corresponding to the vertical slits 612. Each pulley assembly 64 includes a fixed pulley 641. One end of each of the lower hanging ropes 7 is connected to the lifting plate 3, and the other ends of the lower hanging ropes 7 are connected to the anchor plates 63 of the corresponding anchor plate mechanisms.

The two lower hanging ropes 7 are defined as a first lower hanging rope 7a and a second lower hanging rope 7b, respectively, and each lower hanging rope 7 has a first state and a second state. When the lower hanging ropes 7 is in the first state, as shown in FIG. 3 and FIG. 5, the ends of the lower hanging ropes 7 away from the lifting plate 3 are connected to the anchor plates 63 by running through openings on the tops of the model boxes 61; and when the lower hanging ropes 7 are in the second state, as shown in FIG. 4, the ends of the lower hanging ropes 7 away from the lifting plate 3 are connected to the anchor plates 63 after winding around the pulley assemblies 64 and running through the vertical slits 612.

During the test, the winch 2 lifts the anchor plates 63 embedded in the two model boxes 61 by means of the upper hanging rope 4, the lifting plate 3, and the two lower hanging ropes 7, so as to achieve the test purpose. It should be noted that the lifting plate 3 is regarded as a simplified structure of an actual platform structure or frame structure.

The angles formed between the portions of the lower hanging ropes 7 close to the anchor plates 63 and the horizontal line are set as θ, and this angle is also referred to as an embedding angle of the anchor plates 63. During the test, according to the present disclosure, the two anchor plates 63 will be subjected to tests at different depths and angles. When the depths and angles of the anchor plates 63 change, the angle θ between the lower hanging ropes 7 that connect the anchor plates 63 and the horizontal line will also change correspondingly. When the angle θ is adjusted to that the lower rope connection points between the lower hanging ropes 7 and the lifting plate 3, the geometric centers of the anchor plates 63, and the fixed pulleys 641 are on the same straight line as the lower hanging ropes 7, the angle θ between the lower hanging ropes 7 and the horizontal line is equal to θ', and the angle value θ' is a critical angle value that determines whether the lower hanging ropes 7 need to wind around the pulley assemblies 64.

Figure 3:
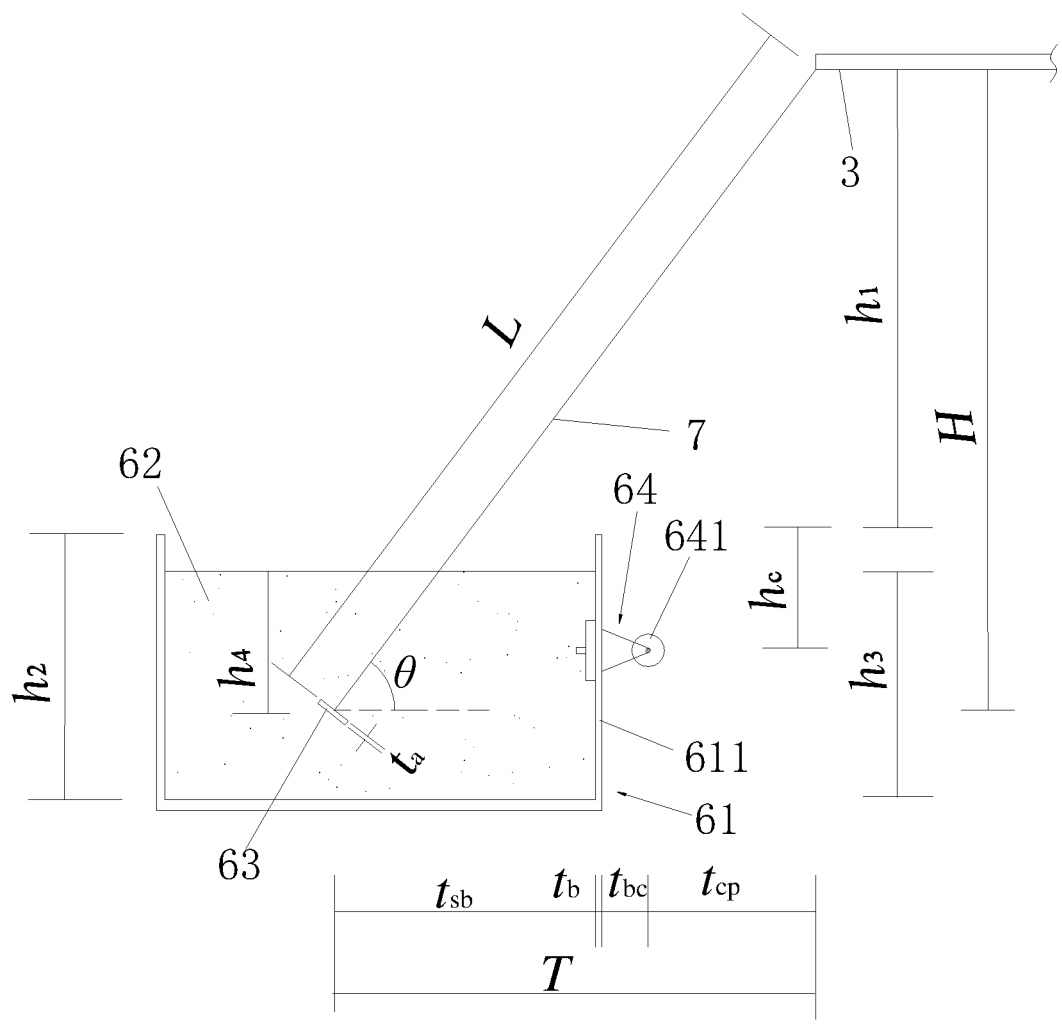
FIG. 3 is a local schematic diagram of the pullout force measurement test device based on an anchor group effect of a marine pipeline shown in FIG. 1 when the angle $\theta$ between a lower hanging rope, which connects an anchor plate, and the horizontal line is greater than or equal to $\theta'$ and less than or equal to 90°.
Figure 4:
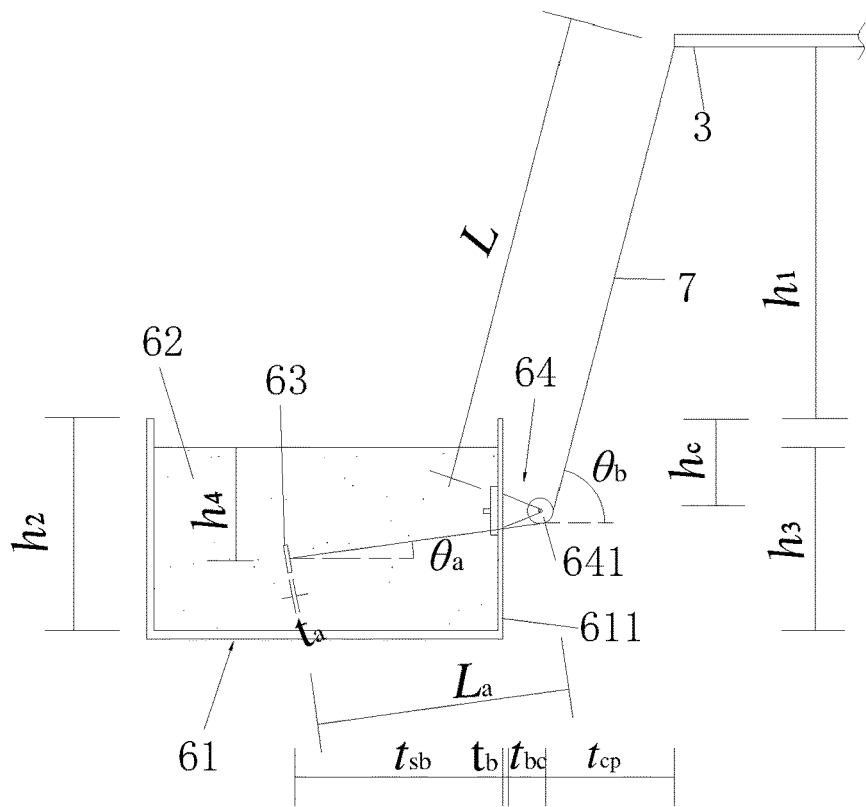
FIG. 4 is a local schematic diagram of the pullout force measurement test device based on an anchor group effect of a marine pipeline shown in FIG. 1 when the angle θ between a lower hanging rope, which connects an anchor plate, and the horizontal line is greater than or equal to 0° and less than or equal to θ'.
Figure 5:
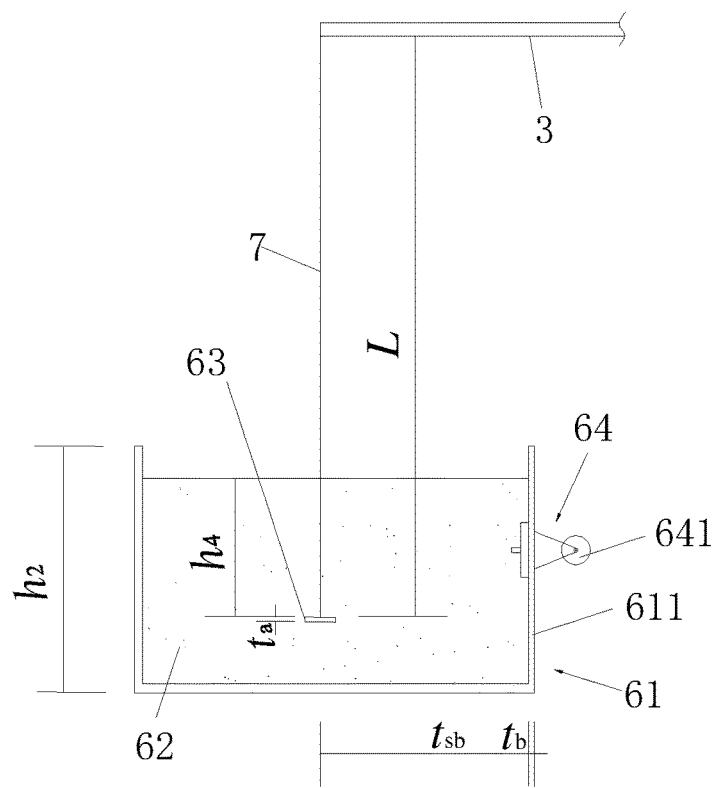
FIG. 5 is a local schematic diagram of the pullout force measurement test device based on an anchor group effect of a marine pipeline shown in FIG. 1 when the angle θ between a lower hanging rope, which connects an anchor plate, and the horizontal line is equal to 90°.

When θ is greater than or equal to θ' and less than or equal to 90°, as shown in FIG. 3 and FIG. 5, the upper hanging rope 4 is in the first state. At this time, the angle θ is large, and the lower hanging ropes 7 will not touch the model boxes 61, and therefore do not need to wind around the pulley assemblies 64. When θ is greater than 0° and less than θ', as shown in FIG. 4, the upper hanging rope 4 is in the second state. At this time, the angle θ is small, and the lower hanging ropes 7 will touch the model boxes 61 if no fixed pulley 641 is used. After the contact, the molded boxes 61 produce great resistance to the lower hanging ropes 7, which resistance will affect the correct accuracy of pullout test results, and therefore the fixed pulleys 641 are needed. Within this angle range, when an angle needs to be changed, only the positions of the fixed pulleys 641 on the model boxes 61 need to be changed. Thus, during the test, the pullout for the anchor plates 63 at any angle within the range of 0°-90° can be realized combined with the pulley assemblies 64 and the vertical slits 612 on the near side walls 611.

Figure 1:
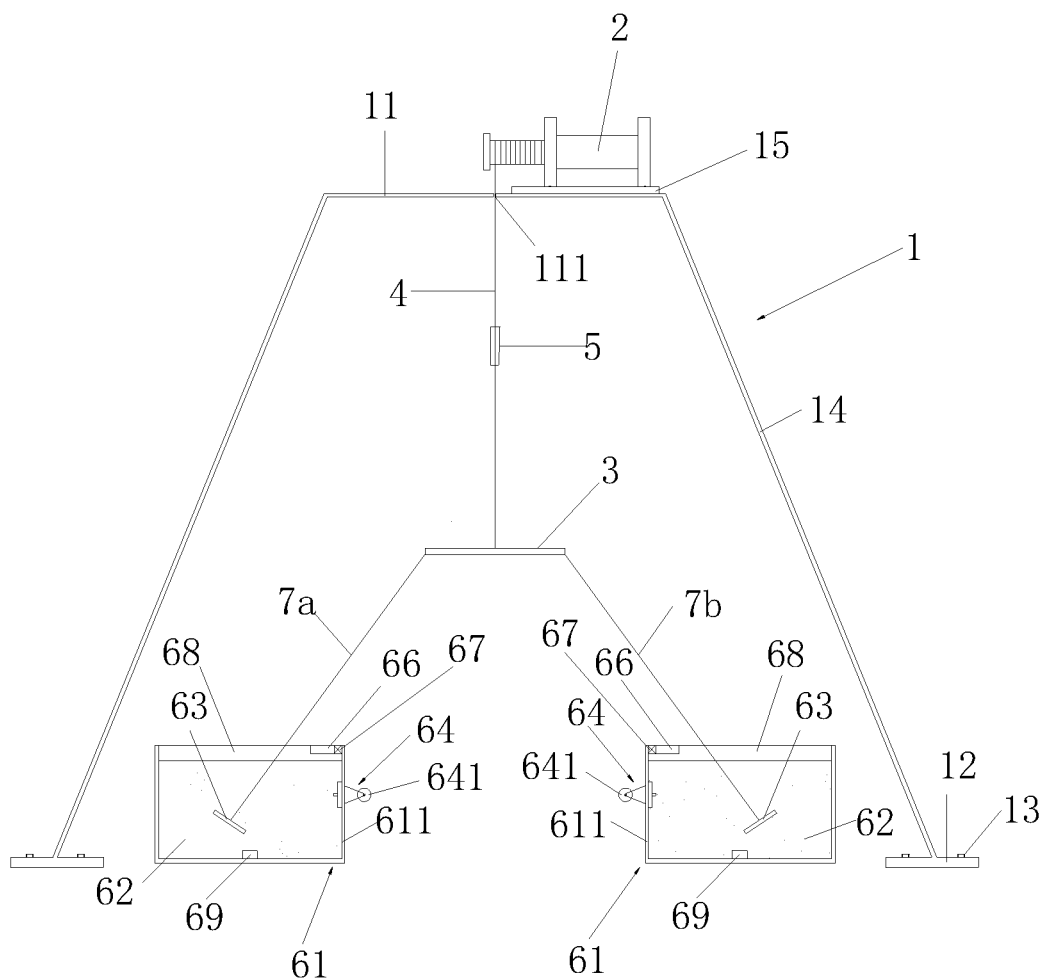
FIG. 1 is a structural front view of the pullout force measurement test device based on an anchor group effect of a marine pipeline according to an embodiment of the present disclosure.

As shown in FIG. 1, the support frame 1 includes a support top plate 11, support foot plates 12 and support rods 14. The support top plate 11 is defined with a rope hole 111, through which the upper hanging rope 4 runs. The support foot plates 12 are located below the support top plate 11, the number of the support rods 14 is equal to that of the support foot plates 12, and the support rods 14 and the support foot plates 12 are arranged in one-to-one correspondence. One end of each of the support rods 14 are all connected to the support top plate 11, and the other ends of the support rods 14 are respectively connected to the corresponding support foot plates 12.

The support top plate 11 is in the shape of a disk, a square disk or other shapes. In this embodiment, the support top plate 11 is preferably disk-shaped.

In this embodiment, the support frame 1 preferably adopts a support quadrupod, that is, there are four support rods 14. Further, each support rod 14 preferably made of a steel bar.

Each support foot plate 12 is provided with a vertical hole, which is equipped with an expansion nut 13 used for fixing the support foot plate 12 on the ground.

In this embodiment, the support rods 14 and the support top plate 11, and the support rods 14 and the support foot plates 12 are both connected by welding. Certainly, the connections between the support rods 14 and the support top plate 11 and between the support rods 14 and the support foot plates 12 are not limited to this, and other methods that can realize the connections between the support rods 14 and the support top plate 11 and between the support rods 14 and the support foot plates 12 can also be used in the present disclosure. For example, in other embodiments, the connections are realized by means of screws or bolts.

The winch 2 is located above the support top plate 11 and mounted on a base 15 fixed above the support top plate 11. Further preferably, the winch 2 is detachably connected to the base 15 by means of bolts.

In this embodiment, the base 15 is connected to the support top plate 11 by welding. In other feasible embodiments, the base 15 may be arranged to be detachably connected to the support top plate 11. For example, the base 15 and the support top plate 11 are connected by means of bolts. Further preferably, in other embodiments, a waist-shaped hole used for making the base 15 move toward the rope hole 111 can be arranged on the support top plate 11 for adjusting the distance from the winch 2 to the rope hole 111, so as to enable the upper hanging rope 4 that connects the winch 2 to run through the rope hole 111 of the support top plate 11 smoothly.

The lifting plate 3 is arranged in a regular shape, which can be square, circular or other shapes. In this embodiment, the lifting plate 3 is preferably in the shape of a square long plate.

The lifting plate 3 is provided with two lower rope connection points, which are respectively connected to the two lower hanging ropes 7, and are arranged symmetrically about the center line of the lifting plate 3. This arrangement can reduce the data required to be measured during the test. In this embodiment, since the lifting plate is in the shape of a square long plate, the lower rope connection points of the lifting plate 3 are preferably end points of the lifting plate 3. The upper hanging rope 4 runs through the rope hole 111 provided on the support top plate 11. By defining, on the support top plate 11, the rope hole 111 for the upper hanging rope 4 to run through, the upper hanging rope 4 can be positioned, and the beneficial effect of preventing the upper hanging rope 4 from seriously swaying and affecting the test results can be achieved.

Both the upper hanging rope 4 and the lower hanging ropes 7 preferably adopt steel twisted ropes. Further preferably, the upper hanging rope 4 is thicker than the lower hanging ropes 7, that is, the upper hanging rope 4 is a thick hanging rope with a larger diameter, and the lower hanging ropes 7 are thin hanging ropes with a smaller diameter. Since the upper hanging rope 4 bears a relatively large force during the test, by setting the upper hanging rope 4 as a thick hanging rope, the upper hanging rope 4 can be prevented from being easily broken when being lifted. In addition, by setting the lower hanging ropes 7 as thin hanging ropes, on the one hand, the force carried by the upper hanging rope 4 can be reduced, thereby achieving the effect of protecting the upper hanging rope 4 and the beneficial effect of reducing the weight of the lower hanging ropes 7 that affects the test accuracy; and on the other hand, the size of the vertical slits 612 on the model boxes 61 through which the lower hanging ropes 7 run can be reduced, thereby achieving the purpose of further reducing the size of the model boxes 61, and reducing the test cost.

In this embodiment, the force measuring mechanism 5 is selected as a force displacement sensor. In this embodiment, the force measuring mechanism 5 is directly and entirely mounted on the upper hanging rope 4. In other embodiments, the force measuring mechanism 5 can also be connected between the lifting plate 3 and the upper hanging rope 4.

Figure 2:
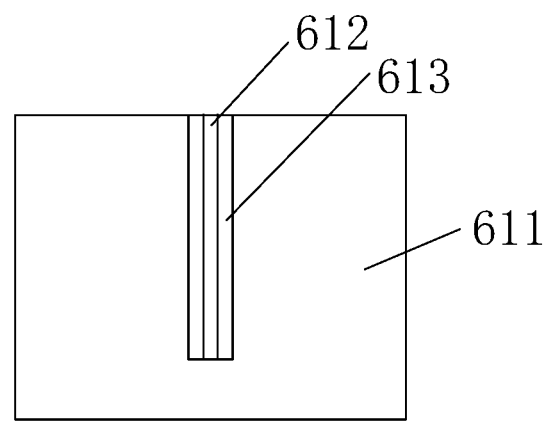
FIG. 2 is a side view of a near side wall of a model box in FIG. 1.

As shown in FIG. 2, at least one side of the vertical slits 612 is provided with a vertical sliding track 613, and the vertical sliding tracks 613 are slidably fitted with the pulley assemblies 65, so that the pulley assemblies 65 can slide on the near side walls 611. After the sliding of the pulley assemblies 65, the pulley assemblies 65 are fixed. In this embodiment, both sides of the vertical slits 612 are provided with the vertical sliding tracks 613.

Preferably, each model box 61 also has a front wall 68 connected to the near side wall 611, and the front walls 68 are made of a transparent material to facilitate the observation of deformation of the soil samples 62. Further preferably, the front walls 68 are made of unbreakable transparent tempered glass.

Further, each model box 61 is provided with a lateral camera 66 and a laser displacement sensor 67. For more accurate measurement, laser displacement sensors 67 are arranged on both sides of the lateral cameras 66. The lateral cameras 66 are used for capturing failure forms of the surface layers of the soil samples 62 in the corresponding model boxes 61. The laser displacement sensors 67 are used for capturing the displacement of the surface layers of the soil samples 62 in the model boxes 61. In this embodiment, all the lateral cameras 66 and the laser displacement sensors 67 are mounted on the near side walls 611 of the model boxes 61.

A front camera 69 is arranged directly in front of the front wall 68 of each model box 61, and positioning marks are defined on the outside of the model boxes 61, preferably on the front walls 68. The front cameras 69 are used for capturing lateral deformation of the soil samples 62 during the winding process, and obtain a displacement vector diagram of the soil samples 62 in the corresponding model boxes 61 on the basis of smooth particle flow technology.

To facilitate the calculation of the length of the two lower hanging ropes 7 and the calculation of the pullout force received by the two lower hanging ropes 7 during the test, the center line of the upper hanging rope 4 and the center lines of the two lower hanging ropes 7 are located on the same plane.

In this embodiment, the length of the lower hanging ropes 7 connected between the lifting plates 3 and the anchor plates 63 is not adjustable. In other embodiments, the length of the lower hanging ropes 7 that can be connected between the lifting plates 3 and the anchor plates 63 is adjustable, so as to prevent frequent replacement of the lower hanging ropes 7. For example, as shown in FIG. 15, vertical square perforations 31 and fastening holes 32 that are vertically communicated with the vertical square perforations 31 are defined at the portions where the lower rope connection points of the lifting plate 3 are located, and fastening bolts 8 are screw-thread fitted in the fastening holes 32; a rotatable rope collecting post 9 is arranged on an upper side of lifting plate 3; effective portions of the lower hanging ropes 7 for lifting are located between the lifting plates 3 and anchor plates 63, and ineffective portions with no need of lifting of the lower hanging ropes 7 are wound on the rope collecting post 9 after running through the vertical square perforations 31; and the ineffective portions, which are located in the vertical square perforations 31, of the lower hanging ropes 7 are clamped between the fastening bolts 8 and the near side walls 611 of the vertical square perforations 31. When the length of the effective portions of the lower hanging ropes 7 is to be adjusted, the fastening bolts 8 are rotated to be away from the portions of the lower hanging ropes 7 in the vertical square perforations 31, and then the effective portions of the lower hanging ropes 7 or the ineffective portions of the lower hanging ropes 7 are pulled to increase or decrease the length of the effective portions of the lower hanging ropes 7 for lifting. After the adjustment, the fastening bolts 8 are rotated to press the ineffective portions, which are located in the vertical square perforations 31, of the lower hanging ropes 7 against the lifting plate 3, so as to fasten the lower hanging ropes 7 on the lifting plate 3.

This embodiment has the beneficial effects as follows: according to the pullout force measurement test device based on an anchor group effect of a marine pipeline of the present disclosure, two model boxes 61 are provided, two anchor plates 63 are respectively embedded in soil samples 62 in the model boxes 61, a winch 2, a lifting plate 3 and an upper hanging rope 4 that connects the winch 2 to the lifting plate 3 are then provided, two lower hanging ropes 7 are connected to the lifting plate 3, and a vertical slit 612 is defined and a pulley assembly 64 that slides relative to a near side wall 611 is mounted on the near side wall 611 of each model box 61 close to the lifting plate 3. During the test, the winch 2 applies a pullout force respectively to the anchor plates 63 placed in the two model boxes 61 by means of the upper hanging rope 4, the lifting plate 3 and the two lower hanging ropes 7, so as to realize a pullout force measurement test of double anchor plates 63; moreover, angles between the lower hanging ropes 7 close to the anchor plates 63 and a horizontal line can be adjusted combined with the vertical slits 612 of the model boxes 61 and the slidable pulley assemblies 64, so as to realize the pullout of the anchor plates 63 at any angle within the range of 0°-90°. Thus, according to the test device of the present disclosure, a pullout force measurement test of double anchor plates 63 can be carried out, so that a failure mode and the law analysis of a pullout force under the combined action of the double anchor plates are revealed, and an influence law and an exertion process of the double anchor plates 63 on an ultimate pullout force of the anchor plates 63 under the combined action of different embedding depths, embedding angles and relative positions can be obtained, thereby achieving the purpose of guiding the engineering design of the anchor plates 63. Moreover, the test device of the present disclosure is simple, but can complete parameter transformation under various test conditions, which not only saves test expenses, but also can more accurately obtain the ultimate pullout force of the anchor plates 63, a pullout failure mechanism and its change rules.

Embodiment 2

Disclosed in this embodiment is a measurement method for a pullout force measurement test device based on an anchor group effect of a marine pipeline, where the measurement method is on the basis of the pullout force measurement test device based on an anchor group effect of a marine pipeline according to embodiment 1, and includes specific measurement steps as follows:

S1, assembling a support frame 1.

Where step S1 specifically includes the following steps:

a1, placing support foot plates 12 horizontally on a test site, and fixing the support foot plates 12 on the ground by expansion nuts 13 running through vertical holes on the support foot plates 12;

In this embodiment, there are four support foot plates 12, which are thus respectively placed in four directions on the test site;

a2, cutting a rope hole 111 at the center of the support top plate 11, and welding a base 15 on the upper surface of the support top plate 11.

S2, mounting a winch 2 on the support frame 1.

Specifically, the winch 2 is placed on the base 15, and fixed on the base 15 with bolts.

S3, mounting a force measuring mechanism 5 on an upper hanging rope 4, and connecting a center of a lifting plate 3 to the winch 2 by means of the upper hanging rope 4, where the lifting plate 3 is provided with two lower rope connection points, which are symmetrical about a center line of the lifting plate 3.

Before the upper hanging rope 4 is connected to the lifting plate 3, the upper hanging rope 4 runs through the rope hole 111 provided on the support top plate 11.

S4, presetting a horizontal distance $t_{cp}$ from fixed pulleys 641 of two pulley assemblies 64 to the corresponding lower rope connection points of the lifting plate 3 for connecting lower hanging ropes 7, and placing, according to the preset horizontal distance $t_{cp}$, two model boxes 61 defined with vertical slits 612 and mounted with the pulley assemblies 64 on the test site in good positions, where each model box 61 has a near side wall 611 close to the lifting plate 3 and a transparent front wall connecting the near side wall 611.

Specifically, before the model boxes 61 are placed on the test site, the vertical slits 612 can be defined on the near side walls 611 of the model boxes 61, the pulley assemblies 64 can be mounted on the near side walls corresponding to the vertical slits 612, and the model boxes 61 can be placed in corresponding positions on the test site according to the preset horizontal distance $t_{cp}$ from the geometric centers of the fixed pulleys to the corresponding lower rope connection points used for connecting the lower hanging ropes 7.

The model boxes 61 can also be first placed on the site, the vertical slits 612 are then defined on the near side plates 611 of the model boxes 61 and the pulley assemblies 64 are mounted corresponding to the vertical slits 612, and the positions of the model boxes 611 on the test site are finally adjusted according to the preset horizontal distance $t_{cp}$ from the geometric centers of the fixed pulleys to the corresponding lower rope connection points of the lifting plate 3 for connecting the lower hanging ropes 7.

S5, referring to FIG. 3, FIG. 4 and FIG. 5, predetermining a pre-embedded depth $h_4$, a pre-pullout angle θ, and a pre-embedded horizontal distance $t_{sb}$ from an inner side of the near side wall 611 of each anchor plate 63 in the corresponding model box, predetermining a filling height $h_3$ of soil samples 62, and measuring a thickness $t_b$ of the near side wall 611 corresponding to each anchor plate 63, a horizontal distance $t_{bc}$ from the centers of the fixed pulleys 641 to the near side walls 611, a radius R of the fixed pulleys 641, a vertical distance $h_1$ from upper edges of the model boxes 61 to the lower rope connection points of the lifting plate for connecting the lower hanging ropes 7, and a clear height $h_2$ of the model boxes 61, where the pre-pullout angle θ is an angle between the portions of the lower hanging ropes 7 close to the anchor plates 63 and a horizontal line; and according to the formula:

$$\theta' = \arccos\left(\frac{RT}{Ht_{cp} - h_1 - RT}\right),$$

calculate a critical angle θ' at which whether each lower hanging rope 7 uses the pulley assemblies 64, where θ' is an angle between the lower hanging ropes 7 and the horizontal line when the lower rope connection points of the lifting plate 3, the anchor plates 63, and the fixed pulleys 641 are on the same straight line, where H is a vertical distance from the geometric centers of the anchor plates 63 to the lower rope connection points of the lifting plate 3, T is a horizontal distance from the lower rope connection points of the lifting plate 3 to center points of the anchor plates 63, and H and T are calculated by the following formulae:

$$H = h_1 + h_2 - h_3 + h_4 - \frac{t_a}{2};$$

The pullout angle θ preset in advance of each anchor plate 63 relative to the critical angle θ' is compared. When θ is greater than θ' and less than 90°, the lower hanging ropes 7 do not need to wind around the fixed pulleys 641; and when θ is greater than or equal to 0° and less than or equal to 0', the lower hanging ropes 7 need to wind around the fixed pulleys 641.

Where the lower rope connection points of the lifting plate 3, the anchor plates 63 and the fixed pulleys 641 being on the same straight line specifically involves: the lower rope connection points between the lifting plates 3 and the lower hanging ropes 7, the lower rope connection points between the anchor plates 63 and the lower hanging ropes 7, and contact points between the fixed pulleys 641 and the lower hanging ropes 7 are on the same straight line. The pullout angle of the anchor plates 63 is specifically an angle between the portions of the lower hanging ropes 7 close to the anchor plates 63 and the horizontal plane.

S6, calculating the length of the lower hanging ropes 7 according to the data obtained in step S5, and if the lower hanging ropes 7 need to wind around the fixed pulleys 641, further calculating the vertical distance from the centers of the fixed pulleys 641 to the upper edges of the model boxes 61, and sliding the fixed pulleys 641 to corresponding positions for fixing.

Further, in step S6, the calculation of the length of the lower hanging ropes 7 by the following formulae specifically involves:

when θ is greater than θ' and less than or equal to 90°, the length of the lower hanging ropes 7 is:

$$L = \sqrt{T^2 + H^2};$$

when θ is greater than or equal to 0° and less than or equal to θ', as shown in FIG. 4, the vertical distance from the geometric centers of the fixed pulleys 641 to the upper edges of the model boxes 61 is:

$$h_c = h_2 - h_3 + h_4 - (T - t_{cp})\tan\theta_a - \frac{R}{\cos\theta_a};$$

By means of the calculation result of the vertical distance from the centers of the fixed pulleys 641 to the upper edges of the model boxes 61, the fixed pulleys 641 can be precisely slid to the desired positions.

the length of the lower hanging ropes 7 from the centers of the anchor plates 63 to tangent points of lower edges of the fixed pulleys 641 is:

$$L_a = \frac{T - t_{cp}}{\cos\theta_a} + R\tan\theta_a;$$

the length of the lower hanging ropes 7 from the tangent points of the fixed pulleys 641 to the angular point of the lifting plate 3 is:

$$L_b = \frac{h_l + h_c}{\sin\theta_b} + R\cot\theta_b;$$

thus, the length of the lower hanging ropes 7 is:

$$L = L_a + L_b = \frac{T - t_{cp}}{\cos\theta_a} + R\tan\theta_a + \frac{h_l + h_c}{\sin\theta_b} + R\cot\theta_b;$$

and when θ is equal to 90°, the length of the lower hanging ropes 7 is:
L=H;
where $$H = h_1 + h_2 - h_3 + h_4 - \frac{t_a}{2},$$

$T = t_{sb} + t_b + t_{bc} + t_{cp};$ $$\theta' = \arccos\left(\frac{RT}{Ht_{cp} - h_1 - RT}\right);$$

in the above-mentioned formulae:

$h_1$ is the vertical distance from the upper edges of the model boxes 61 to the lower surface of the lifting plate 3;

$h_2$ is the clear height of the model boxes 61, excluding the thickness of bottom plates of the model boxes 61;

$h_3$ is the height of the soil samples 62;

$h_4$ is the embedded depth of the anchor plates 63;

$h_c$ is the vertical distance from the geometric centers of the fixed pulleys 641 to the upper edges of the model boxes 61;

H is a vertical distance from center points of the anchor plates 63 to a horizontal plane where the lower rope connection points of the lifting plate 3 are located;

T is a horizontal distance from the lower rope connection points of the lifting plate 3 to geometric centers of the anchor plates 63;

$t_a$ is a thickness of the anchor plates 63;

θ is the angle between the lower hanging ropes 7 and the horizontal line;

$\theta_a$ is an angle between the lower hanging ropes 7, which are located below the fixed pulleys 641, and the horizontal line when the fixed pulleys 641 are used;

$\theta_b$ is an angle between the lower hanging ropes 7, which are located above the fixed pulleys 641, and the horizontal line when the fixed pulleys 641 are used;

θ' is an angle between the lower hanging ropes 7 and the horizontal line when the lower rope connection points of the lifting plate 3, the geometric centers of the anchor plates 63, and the contact points between the fixed pulleys 641 and the lower hanging ropes 7 are on the same straight line;

$t_{sb}$ is the horizontal distance from the geometric centers of the anchor plates 63 to the inner sides of the near side walls 611 of the model boxes 61;

$t_b$ is the thickness of the near side walls 611 of the model boxes 61;

$t_{cp}$ is the horizontal distance from the geometric centers of the fixed pulleys 641 to the lower rope connection points where the lifting plate 3 is connected to the lower hanging ropes 7;

$t_{bc}$ is the horizontal distance from the geometric centers of the fixed pulleys 641 to outer surfaces of the near side walls 611 of the model boxes 61; and R is the radius of the fixed pulleys 641.

Where $h_1$, $h_2$, $\theta_b$, $t_b$, $t_{cp}$, $t_{bc}$ and R are all obtained by means of measurement, while θ, $\theta_a$, $h_3$, $h_4$, $t_a$ and $t_{sb}$ are data preset according to test needs.

$h_1$, $h_2$, $h_3$, $h_4$, $h_c$, $t_a$, $\theta_a$, $\theta_b$, $t_{sb}$, $t_b$, $t_{cp}$, $t_{bc}$ and R corresponding to each of the two anchor plates are substituted into the required formulae, so that corresponding length of the lower hanging ropes 7 used for realizing the lifting can be calculated.

S7, providing two lower hanging ropes 7 of a required length according to the calculation formula for the length of the lower hanging ropes 7, where the two lower hanging ropes 7 and the model boxes 61 are arranged in one-to-one correspondence, connecting one end of each of the two lower hanging ropes 7 to a respective one of the two lower rope connection points of the lifting plate 3, and according to a comparison result between the pre-pullout angle θ of the corresponding anchor plates 63 and the critical angle θ', directly connecting the other ends of the two lower hanging ropes 7 to the anchor plates 63 without running through the vertical slits 612 of the corresponding model boxes 61, or connecting the other ends of the two lower hanging ropes 7 to the anchor plates 63 after winding around the fixed pulleys 641 and running through the vertical slits 612.

Further, when the upper hanging rope 4 and the two lower hanging ropes 7 are mounted, the center line of the upper hanging rope 4 and the center lines of the two lower hanging ropes 7 are ensured to be located on the same plane, so that a constructed force analysis geometric diagram is relatively simple when the pullout force received by the lower hanging ropes 7 is analyzed, and a constructed force equation is further relatively simple, which is convenient for the follow-up to quickly calculate the result of the pullout force received by the lower hanging ropes 7.

S8, filling the soil samples 62 into the model boxes 61, and when the filling height and the pre-embedded depth of the anchor plates 63 are equal to $h_4$, placing the anchor plates 63 into specified positions on the surfaces of the soil samples 61 according to the pre-embedded depth $h_4$ and the pre-embedded horizontal distance $t_{sb}$ and fixing the anchor plates 63, and then continue to fill the soil samples 62 into the model boxes 61 until the soil samples 62 are filled to the specified height.

In the process of filling the soil samples 62 into the model boxes 61, to facilitate the observation of the lateral deformation of the soil samples 62, a layer of colored sand is coated on the inner sides of the transparent front walls of the model boxes 612 every time a certain height is filled to. When the soil samples 62 are filled to the specified height, the soil filling is stopped.

S9, mounting a lateral camera and a laser displacement sensor on each model box 61, and arranging a front camera directly in front of the front wall of each model box 61.

In this embodiment, both the lateral cameras and the laser displacement sensors are arranged on the near side walls 611 of the model boxes 61.

S10, checking the test device, and loading and testing equipment, and after potential hidden dangers are eliminated, starting the winch 2 to load, turning on the lateral cameras and the front cameras to capture the deformation of the soil samples 62, and obtaining a displacement vector diagram of the soil samples 4 in the two model boxes on the basis of smooth particle flow technology.

Specifically, the lateral cameras are used for capturing the failure form of the surface layers of the soil samples 62 in the corresponding model boxes 61; the laser displacement sensors are used for capturing the displacement of the surface layers of the soil samples 62 in the model boxes 61; and the front cameras are used for capturing the lateral deformation of the soil samples 62 during the winding process of the winch.

S11, reading, by the force measuring mechanism, a traction force applied by the winch 2 during the test, and calculating the pullout force received by each lower hanging rope 7.

By calculating the pullout force received by each lower hanging rope 7, the deformation of the soil samples 62 pushed by the two anchor plates 63 under the action of different pullout forces can be captured, and an ultimate pullout force borne by the anchor plates 63 can be accurately calculated.

The stress situation of each lower hanging rope 7 are analyzed and explained by first taking the situation that both the lower hanging ropes 7 do not wind around the fixed pulleys 641 as an example.

Figure 6:
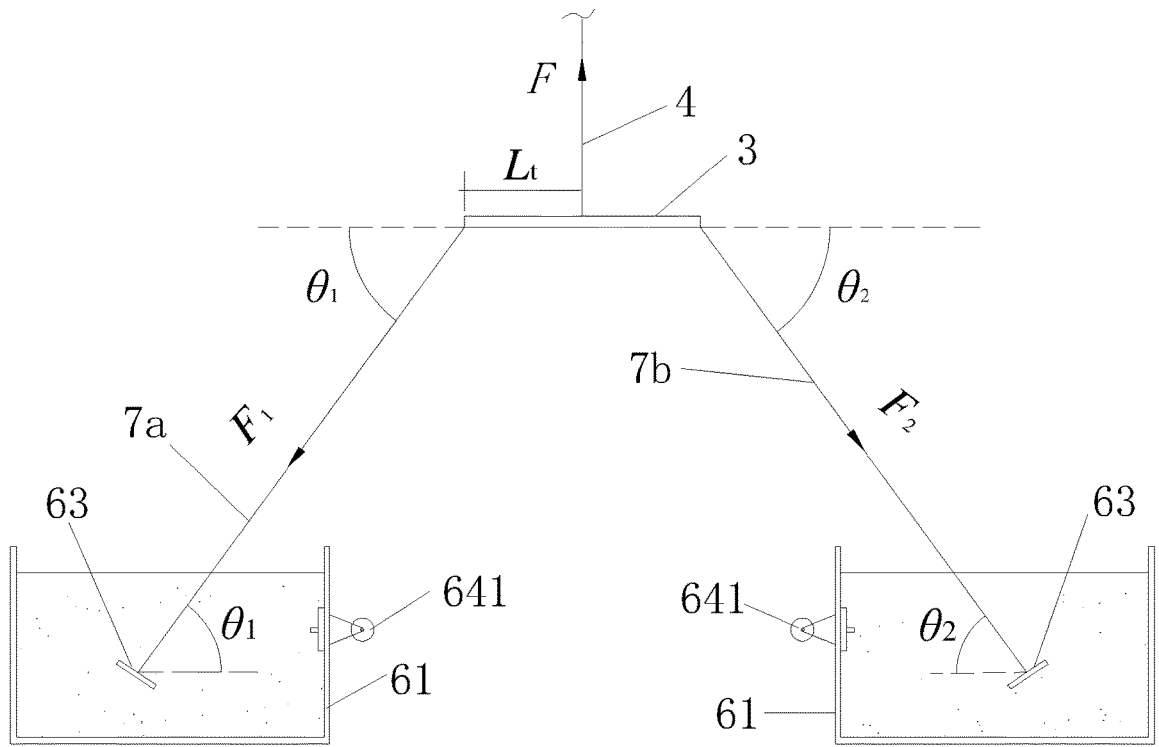
FIG. 6 is a local schematic diagram of the pullout force measurement test device based on an anchor group effect of a marine pipeline according to one of the embodiments when neither the first lower hanging rope nor the second lower hanging rope winds around the fixed pulleys, and the lifting plate remains horizontal.

As shown in FIG. 6, if the lifting plate 3 remains horizontal, it is concluded that:

the pullout force received by the first lower hanging rope 7a is:

$$F_1 = \frac{F\cos\theta_2}{\sin(\theta_1 + \theta_2)}; \quad (1.1)$$

the pullout force received by the second lower hanging rope 7b is:

$$F_2 = \frac{F\cos\theta_1}{\sin(\theta_1 + \theta_2)}; \quad (1.2)$$

when $\theta_1 = \theta_2$, it can be concluded from formulae 1.1 and 1.2 that:

$$F_1 = F_2 = \frac{F}{\sin\theta_1 + \sin\theta_2} = \frac{F}{2\sin\theta_1} = \frac{F}{2\sin\theta_2},$$

Figure 7:
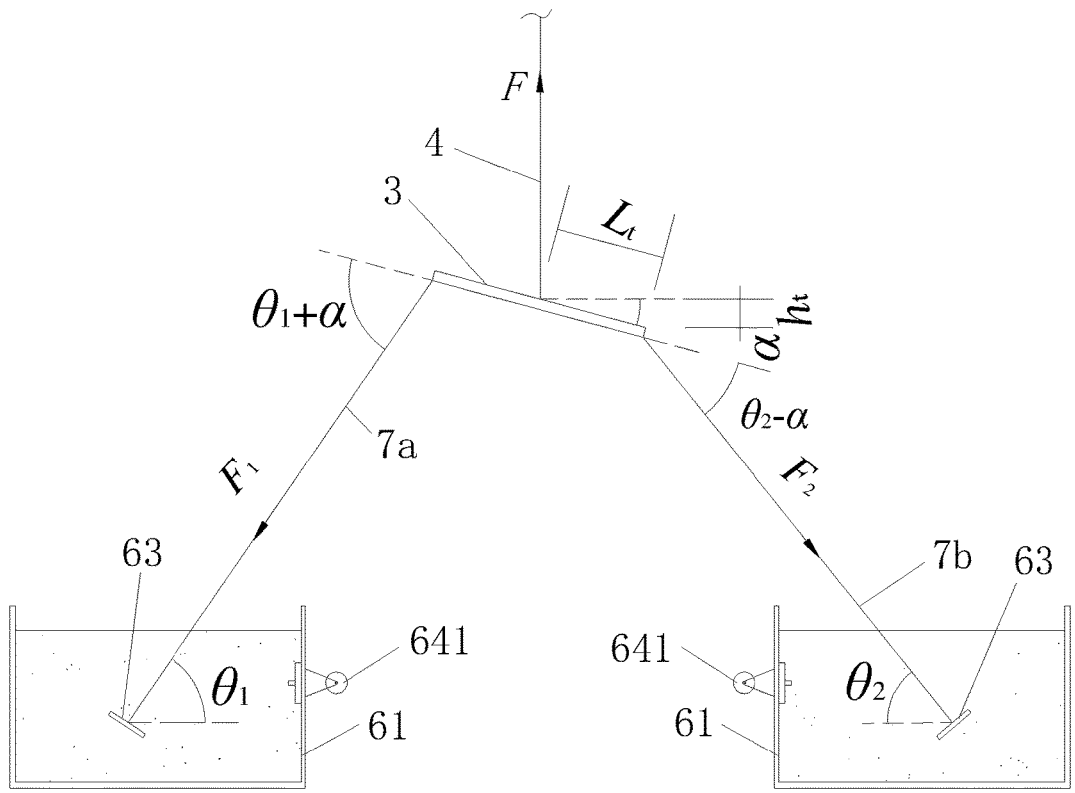
FIG. 7 is a local schematic diagram of the pullout force measurement test device based on an anchor group effect of a marine pipeline shown in FIG. 6 when neither the first lower hanging rope nor the second lower hanging rope winds around the fixed pulleys, and the lifting plate is in the state of left side up and right side down.

As shown in FIG. 7, the first lower hanging rope 7a is on the left side, and the second lower hanging rope 7b is on the right side; and if the lifting plate 3 is tilted with left side up and right side down, it is concluded that:

the pullout force received by the first lower hanging rope 7a is:

$$F_1 = \frac{F[\cos\alpha - \sin\alpha\tan(\theta_2 - \alpha)]}{\sin(\theta_1 + \alpha) + \cos(\theta_1 + \alpha)\tan(\theta_2 - \alpha)}; \quad (1.3)$$

the pullout force received by the second lower hanging rope 7b is:

$$F_2 = \frac{F[\cos\alpha + \sin\alpha\tan(\theta_1 + \alpha)]}{\sin(\theta_2 - \alpha) + \cos(\theta_2 - \alpha)\tan(\theta_1 + \alpha)}. \quad (1.4)$$

Figure 8:
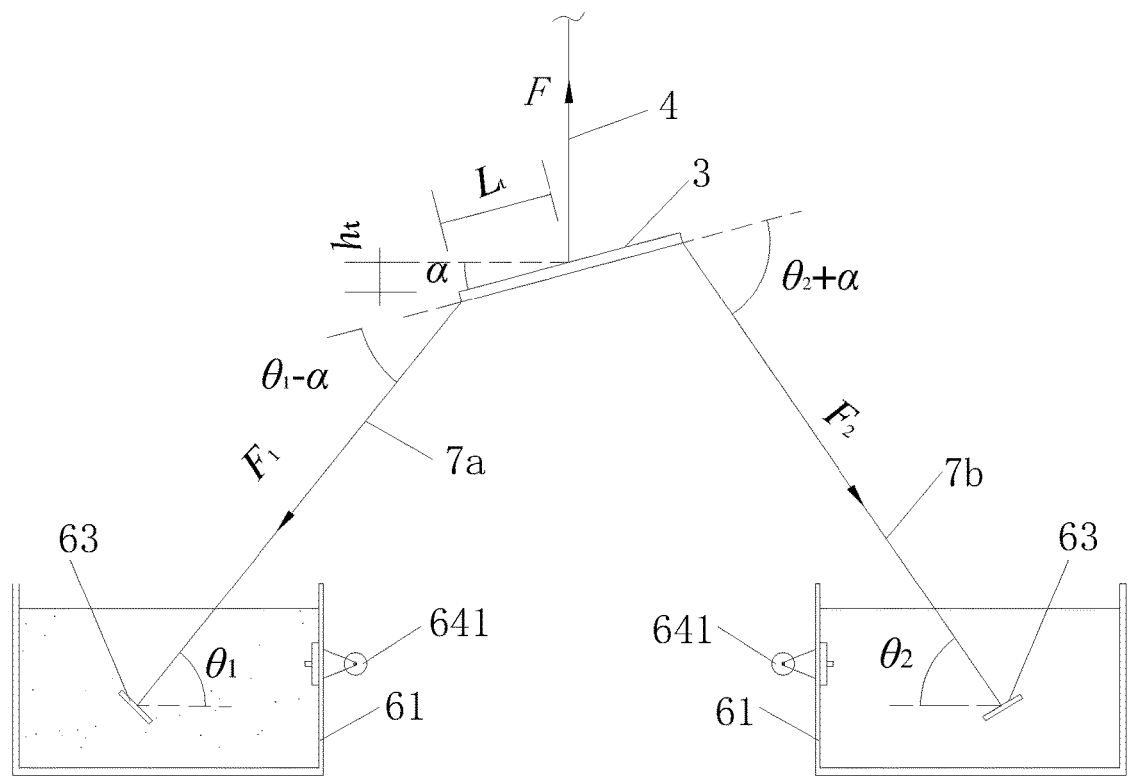
FIG. 8 is a local schematic diagram of the pullout force measurement test device based on an anchor group effect of a marine pipeline shown in FIG. 6 when neither the first lower hanging rope nor the second lower hanging rope winds around the fixed pulleys, and the lifting plate remains the state of left side down and right side up.

As shown in FIG. 8, if the two anchor plates are tilted with left sides down and right sides up, it is concluded that:

the pullout force received by the first lower hanging rope 7a is:

$$F_1 = \frac{F(\cos\alpha + \sin\alpha\tan(\theta_2 + \alpha))}{\sin(\theta_1 - \alpha) + \cos(\theta_1 - \alpha)\tan(\theta_2 + \alpha)}; \quad (1.5)$$

the pullout force received by the second lower hanging rope 7b is:

$$F_2 = \frac{F(\cos\alpha - \sin\alpha\tan(\theta_1 + \alpha))}{\sin(\theta_2 + \alpha) + \cos(\theta_2 + \alpha)\tan(\theta_1 - \alpha)}; \quad (1.6)$$

where $$\alpha = \arcsin\frac{h_t}{L_t}; \quad (1.7)$$

in the above-mentioned formulae:

$\theta_1$ is an angle between the first lower hanging rope 7a, which does not wind around one fixed pulley 641, and the horizontal line;

$\theta_2$ is an angle between the second lower hanging rope 7b, which does not wind around the other fixed pulley 641, and the horizontal line;

$\alpha$ is an angle at which the lifting plate 3 is tilted;

F is a measured value of the force measuring mechanism 5;

$L_t$ is a vertical distance from the lower rope connection points of the lifting plate 3 to the center line of the lifting plate 3; and $h_t$ is a projection distance of half of the lifting plate 3 on a plumb line after the lifting plate 3 is tilted;

$\theta_1$ and $\theta_2$ are angles preset according to test needs, F is measured by the force measuring mechanism 5, and $L_t$ and $h_t$ are obtained by means of measurement. According to the inclination of the lifting plate 3, the known data are put into appropriate calculation formulae for the bearing capacity received by the lower hanging ropes 7, so that the pullout force received by the first lower hanging rope 7a and the pullout force received by the second lower hanging rope 7b can be obtained.

Next, other situations with regard to the first hanging rope and the second hanging rope are analyzed. When both the first lower hanging rope 7a and the second lower hanging rope 7b wind around the fixed pulleys 641, as shown in FIG. 9 to FIG. 11, $\theta_1$ is replaced with the angle between the first lower hanging rope 7a, which is located between one fixed pulley 641 and the lifting plate 3, and the horizontal line, and $\theta_2$ is replaced with the angle between the second lower hanging rope 7b, which is located between the other fixed pulley 641 and the lifting plate 3, and the horizontal line, where $\theta_1$ and $\theta_2$ are obtained by means of measurement.

Figure 9:
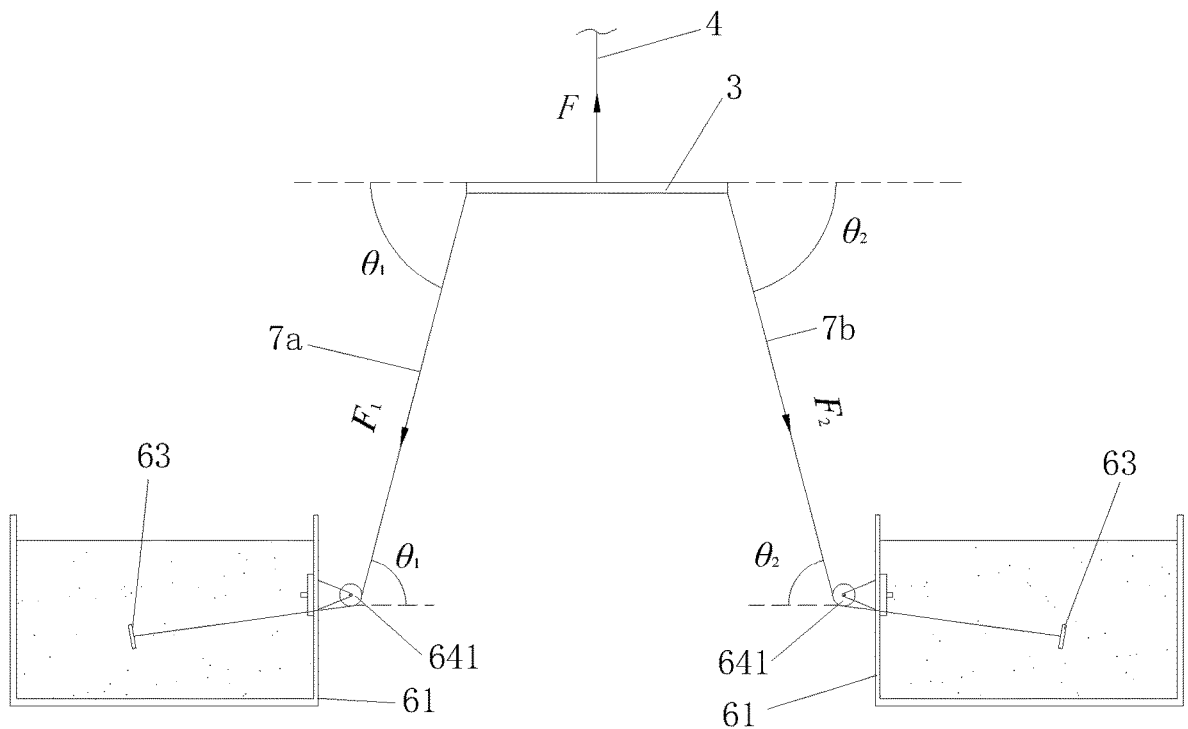
FIG. 9 is a local schematic diagram of the pullout force measurement test device based on an anchor group effect of a marine pipeline according to one of the embodiments when both the first lower hanging rope and the second lower hanging rope wind around the fixed pulleys, and the lifting plate remains horizontal.
Figure 10:
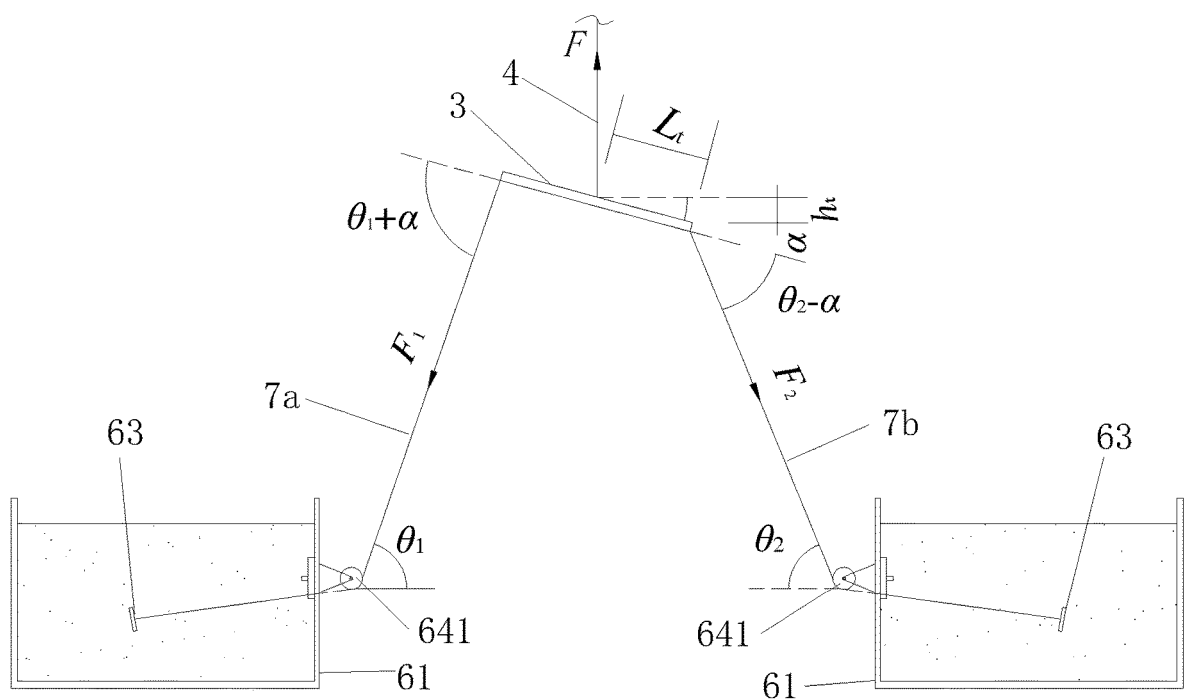
FIG. 10 is a local schematic diagram of the pullout force measurement test device based on an anchor group effect of a marine pipeline shown in FIG. 9 when both the first lower hanging rope and the second lower hanging rope wind around the fixed pulleys, and the lifting plate is in the state of left side up and right side down.
Figure 11:
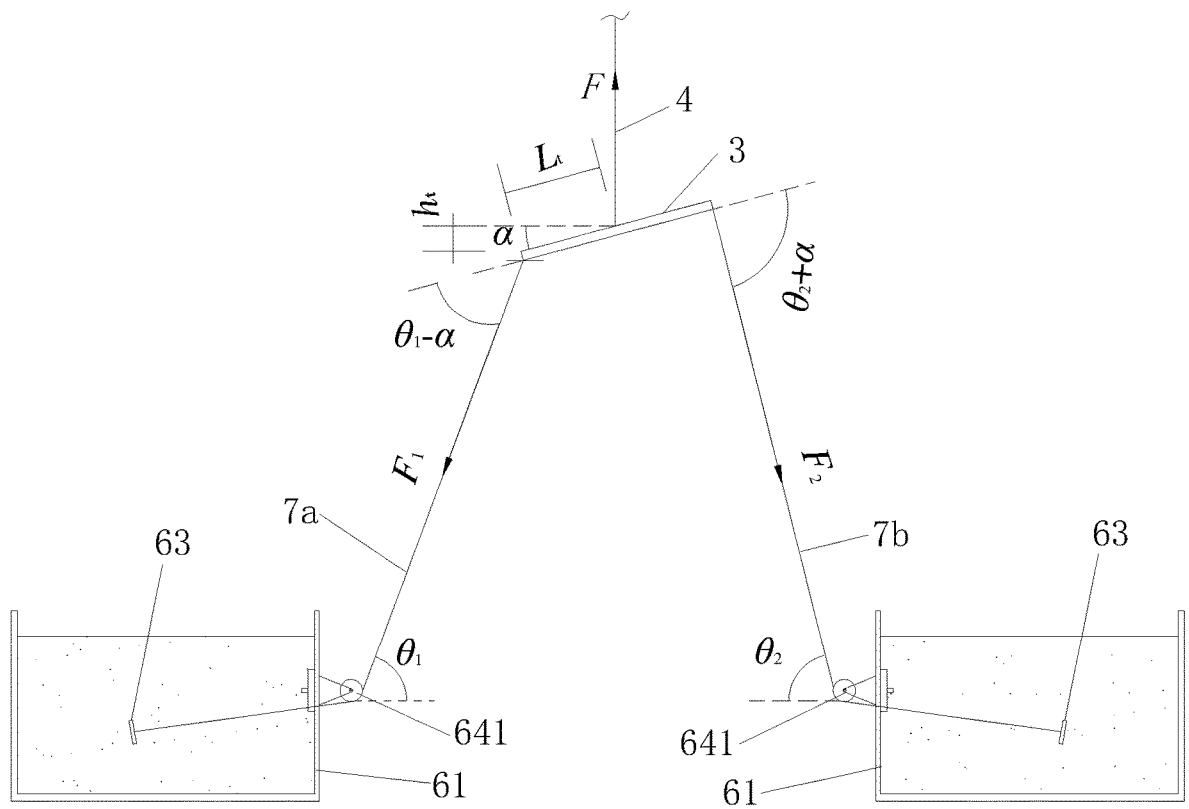
FIG. 11 is a local schematic diagram of the pullout force measurement test device based on an anchor group effect of a marine pipeline shown in FIG. 9 when both the first lower hanging rope and the second lower hanging rope wind around the fixed pulleys, and the lifting plate is in the state of left side down and right side up.

Therefore, under the condition that both the first lower hanging rope 7a and the second lower hanging rope 7b wind around the fixed pulleys 641, as shown in FIG. 9, when the lifting plate 3 remains horizontal, it can be seen from analysis that the calculation of the pullout force $F_1$ received by the first lower hanging rope 7a and the calculation of the pullout force $F_2$ received by the second lower hanging rope 7b still use the above-mentioned formula 1.1 and formula 1.2; as shown in FIG. 10, when the lifting plate 3 is tilted with left side down and right side up, the calculation of the pullout force $F_1$ received by the first lower hanging rope 7a and the calculation of the pullout force $F_2$ received by the second lower hanging rope 7b still use the above-mentioned formula 1.3 and formula 1.4; and as shown in FIG. 11, when the lifting plate 3 is tilted with left side up and right side down, the calculation of the pullout force $F_1$ received by the first lower hanging rope 7a and the calculation of the pullout force $F_2$ received by the second lower hanging rope 7b still use the above-mentioned formula 1.5 and formula 1.6, and a is still calculated by using formula 1.7.

Figure 13:
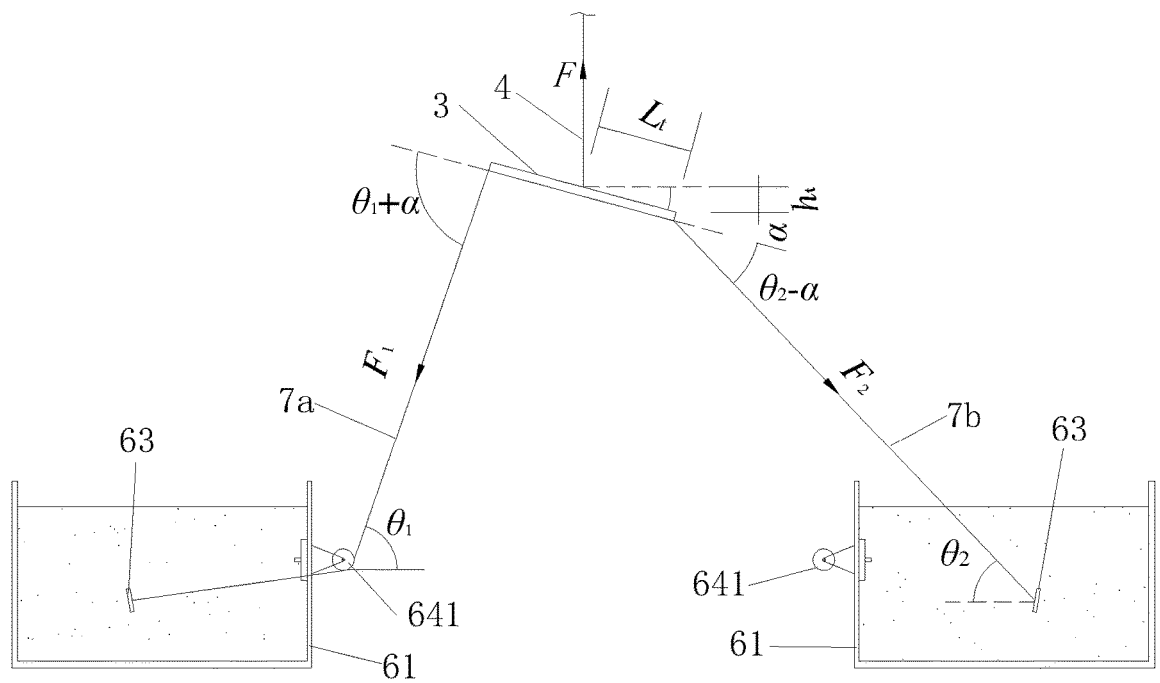
FIG. 13 is a local schematic diagram of the pullout force measurement test device based on an anchor group effect of a marine pipeline shown in FIG. 12 when the first lower hanging rope winds around one fixed pulley but the second lower hanging rope does not wind around the other fixed pulley, and the lifting plate is in the state of left side up and right side down.

With regard to the situation in the two lower hanging ropes 7 that one lower hanging rope 7 wind around one fixed pulley 641 and the other lower hanging rope 7 does not wind around the other fixed pulley 641, this specification takes the first lower hanging rope 7a winding around one fixed pulley 641 but the second lower hanging rope 7b not winding around the other fixed pulley 641 as an example for description. As shown in FIG. 12 to FIG. 14, only $\theta_1$ is replaced with the angle between the first lower hanging rope 7a, which is located between one fixed pulley 641 and the lifting plate 3, and the horizontal line, while $\theta_2$ is still the angle between the second lower hanging rope 7b, which does not wind around the other fixed pulley 641, and the horizontal line, where $\theta_1$ is obtained by means of measurement, and $\theta_2$ is an angle preset according to test needs.

Therefore, under the condition that the first lower hanging rope 7a winds around one fixed pulleys 641, but the second lower hanging rope 7b does not wind around the other fixed pulleys 641, as shown in FIG. 12, when the lifting plate 3 remains horizontal, the calculation of the pullout force $F_1$ received by the first lower hanging rope 7a and the calculation of the pullout force $F_2$ received by the second lower hanging rope 7b still use the above-mentioned formula 1.1 and formula 1.2; as shown in FIG. 13, when the lifting plate 3 is tilted with left side down and right side up, the calculation of the pullout force $F_1$ received by the first lower hanging rope 7a and the calculation of the pullout force $F_2$ received by the second lower hanging rope 7b also still use the above-mentioned formula 1.3 and formula 1.4; and as shown in FIG. 14, when the lifting plate 3 is tilted with left side up and right side down, the calculation of the pullout force $F_1$ received by the first lower hanging rope 7a and the calculation of the pullout force $F_2$ received by the second lower hanging rope 7b still use the above-mentioned formula 1.5 and formula 1.6, and $\alpha$ is still calculated by using formula 1.7.

It can be seen there-from that, as long as $\theta_1$ and $\theta_2$ are subjected to corresponding meaning conversion according to whether the first lower hanging rope 7a and the second lower hanging rope 7b wind around the fixed pulleys 641, the calculation of the pullout force $F_1$ received by the first lower hanging rope 7a and of the pullout force $F_2$ received by the second lower hanging rope 7b can be realized according to the inclination of the lifting plate 3 by selecting corresponding formulae from formula 1.1, formula 1.2, formula 1.3, formula 1.4, formula 1.5, and formula 1.6.

According to the measurement method for a pullout force measurement test device based on an anchor group effect of a marine pipeline of the present disclosure, by means of close combination of the two lower hanging ropes 7 and the cooperation between the pulley assemblies 64 and the vertical slits 612 during the test, the influence of different embedding angles at the same relative position on the bearing capacity of the two anchor plates 63 can be simulated, and the influence of the same embedding angle at different relative positions on the bearing capacity of the two anchor plates 63 can also be simulated, thereby achieving the purpose of guiding the engineering design of the anchor plates.

In addition, the front walls of two model boxes 61 are set to be made of a transparent material and positioning mark points are preset, lateral cameras and laser displacement sensors are mounted on the near side walls 611, and front cameras are arranged directly in front of the front walls, so that movement trajectories of the anchor plates 63 and deformation and failure forms of the soil samples 62 can be captured accurately in real time.

The above descriptions are only preferred embodiments of the present disclosure, and are not intended to limit the present disclosure. Any modifications, equivalent replacements and improvements made within the spirit and principles of the present disclosure should be included in the protection scope of the present disclosure.

What is claimed is:

1. A measurement method for a pullout force measurement test device based on an anchor group effect of a marine pipeline, wherein the test device comprises a support frame, a winch mounted on the support frame, a lifting plate located below the winch, an upper hanging rope which connects the winch to the lifting plate, a force measuring mechanism mounted on the upper hanging rope, two anchor plate mechanisms arranged below the lifting plate, and two lower hanging ropes, wherein each pair of the lower hanging ropes and the anchor plate mechanisms are located on both sides of the upper hanging rope, and are arranged in one-to-one correspondence; each anchor plate mechanism comprises a model box, a soil sample filled in the model box, an anchor plate embedded in the soil sample, and a pulley assembly; near side walls close to the lifting plate are provided in the model boxes, and vertical slits are defined on the near side walls; the pulley assemblies are slidably mounted on the near side walls corresponding to the vertical slits; each pulley assembly comprises a fixed pulley; one end of each lower hanging rope is connected to the lifting plate, and the other end of each lower hanging rope is connected to the anchor plate of the corresponding anchor plate mechanism;

the lower hanging ropes have a first state and a second state; when the lower hanging ropes are in the first state, the ends of the lower hanging ropes away from the lifting plate are connected to the anchor plates by running through openings on the tops of the model boxes; and when the lower hanging ropes are in the second state, the ends of the lower hanging ropes away from the lifting plate are connected to the anchor plates after winding around the pulley assemblies and running through the vertical slits;

the support frame comprises a support top plate, support foot plates and support rods, wherein the support top plate is defined with a rope hole, and the upper hanging rope runs through the rope hole; the support foot plates are located below the support top plate, the number of the support rods is equal to that of the support foot plates, and the support rods and the support foot plates are arranged in one-to-one correspondence; one end of each of the support rods is connected to the support top plate, and the other end of each of the support rods is connected to the corresponding support foot plates;

a center line of the upper hanging rope and center lines of the two lower hanging ropes are located on a same plane;

each near side wall is provided with a lateral camera and a laser displacement sensor, wherein the lateral cameras are used for capturing deformation of the upper surfaces of the soil samples during a winding process of the winch, and the laser displacement sensors are used for capturing the displacement of the upper surfaces of the soil samples during the winding process of the winch;

each model box further has a front wall, which is made of a transparent material; and a front camera is arranged in front of each front wall for capturing lateral deformation of the soil samples;

the lifting plate is provided with two lower rope connection points, which are arranged symmetrically about the center line of the lifting plate, and the two lower hanging ropes are respectively connected to the two lower rope connection points;

the measurement method based on the test device comprises the following steps:

S1, mounting a support frame on a test site;

S2, mounting a winch on the support frame;

S3, mounting the force measuring mechanism on an upper hanging rope, and connecting a center of a lifting plate to the winch by means of the upper hanging rope, wherein the lifting plate is provided with two lower rope connection points, which are symmetrical about a center line of the lifting plate;

S4, presetting a horizontal distance $t_{cp}$ from fixed pulleys of two pulley assemblies to the corresponding lower rope connection points of the lifting plate, and placing, according to the preset horizontal distance $t_{cp}$, two model boxes defined with vertical slits and mounted with the pulley assemblies on the test site in good positions;

S5, predetermining a pre-embedded depth $h_4$, a pre-pullout angle $\theta$, and a pre-embedded horizontal distance $t_{sb}$ from an inner side wall of the near side wall of each anchor plate in the corresponding model box, predetermining a filling height $h_3$ of soil samples, and measuring a thickness $t_b$ of the near side wall corresponding to each anchor plate, a horizontal distance $t_{bc}$ from the centers of the fixed pulleys to the near side walls, a radius R of the fixed pulleys, a vertical distance $h_1$ from upper edges of the model boxes to the lower rope connection points of the lifting plate, a clear height $h_2$ of the model boxes, and a vertical distance $h_c$ from the centers of the fixed pulleys to the upper edges of the model boxes, where the pre-pullout angle $\theta$ of the anchor plates is an angle between the lower hanging ropes close to the anchor plates and a horizontal line; and according to the formula:

$$\theta' = \arccos\left(\frac{RT}{Ht_{cp} - h_1 - RT}\right),$$

calculating a critical angle $\theta'$ at which each lower hanging rope needs to wind around the pulley assemblies, where $\theta'$ is an angle between the lower hanging ropes and the horizontal line when the lower rope connection points of the lifting plate, the anchor plates, and contact points of the fixed pulleys and the lower hanging ropes are on the same straight line, where $$H = h_1 + h_2 - h_3 + h_4 - \frac{t_a}{2};$$

$T = t_{sb} + t_b + t_{bc} + t_{cp};$
where
when $\theta$ is greater than $\theta'$ and less than 90°, the lower hanging ropes do not need to wind around the fixed pulleys; and when $\theta$ is greater than or equal to 0° and less than or equal to $\theta'$, the lower hanging ropes need to wind around the fixed pulleys;

S6, calculating a required length of the lower hanging ropes according to the data obtained in step S5, and in response to need of the lower hanging ropes to wind around the fixed pulleys, further calculating the vertical distance from the centers of the fixed pulleys to the upper edges of the model boxes, and sliding the fixed pulleys to corresponding positions for fixing;

the step of calculating the length of the lower hanging ropes by the following formulae specifically involves:

when $\theta$ is greater than $\theta'$ and less than 90°, the length of the lower hanging ropes is:

$$L = \sqrt{T^2 + H^2};$$

when $\theta$ is greater than or equal to 0° and less than or equal to $\theta'$, the vertical distance from geometric centers of the fixed pulleys to the upper edges of the model boxes is:

$$h_a = h_2 - h_3 + h_4 - (T - t_{cp})\tan\theta_a - \frac{R}{\cos\theta_a};$$

the length of the lower hanging ropes from the centers of the anchor plates to tangent points between the lower hanging ropes and lower edges of the fixed pulleys is:

$$L_a = \frac{T - t_{cp}}{\cos\theta_a} + R \tan\theta_a;$$

the length of the lower hanging ropes from the tangent points between the lower hanging ropes and the lower edges of the fixed pulleys to the lower rope connection points of the lifting plate is:

$$L_b = \frac{h_1 + h_c}{\sin\theta_b} + R \cot\theta_b;$$

thus, the length of the lower hanging ropes is:

$$L = L_a + L_b = \frac{T - t_{cp}}{\cos\theta_a} + R \tan\theta_a + \frac{h_1 + h_c}{\sin\theta_b} + R \cot\theta_b;$$

and
when $\theta$ is equal to 90°, the length of the lower hanging ropes is:
$L = H;$ in the above-mentioned formulae:

$h_1$ is the vertical distance from the upper edges of the model boxes to the lower rope connection points where the lifting plate is connected to the lower hanging ropes;

$h_2$ is the clear height of the model boxes, excluding the thickness of bottom plates of the model boxes;

$h_3$ is the filling height of the soil samples;

$h_4$ is the embedded depth of the anchor plates;

$h_c$ is the vertical distance from the geometric centers of the fixed pulleys to the upper edges of the model boxes;

H is a vertical distance from center points of the anchor plates to a horizontal plane where the lower rope connection points of the lifting plate are located;

T is a horizontal distance from the lower rope connection points of the lifting plate to geometric centers of the anchor plates;

$t_a$ is a thickness of the anchor plates;

θ is the angle between the lower hanging ropes and the horizontal line;

$θ_a$ is an angle between the lower hanging ropes, which are located below the fixed pulleys, and the horizontal line when the fixed pulleys are used;

$θ_b$ is an angle between the lower hanging ropes, which are located above the fixed pulleys, and the horizontal line when the fixed pulleys are used;

θ' is an angle between the lower hanging ropes and the horizontal line when the lower rope connection points of the lifting plate, the geometric centers of the anchor plates, and the contact points between the fixed pulleys and the lower hanging ropes are on the same straight line;

$t_{sb}$ is the horizontal distance from the geometric centers of the anchor plates to the inner sides of the near side walls of the model boxes;

$t_b$ is the thickness of the near side walls of the model boxes;

$t_{cp}$ is the horizontal distance from the center points of the fixed pulleys to the lower rope connection points of the lifting plate;

$t_{bc}$ is the horizontal distance from the centers of the fixed pulleys to outer surfaces of the near side walls of the model boxes; and R is the radius of the fixed pulleys;

where $h_1$, $h_2$, $t_a$, $θ_b$, $t_b$, $t_{bc}$, $t_{cp}$ and R are all obtained by means of measurement, while θ, $θ_a$, $h_3$, $h_4$ and $t_{sb}$ are data preset according to test needs;

S7, providing two lower hanging ropes of the required length according to a calculation result in step S6, wherein the two lower hanging ropes and the model boxes are arranged in one-to-one correspondence, connecting one end of each of the two lower hanging ropes to a respective one of the two lower rope connection points of the lifting plate, and according to a comparison result between the pre-pullout angle θ and the corresponding critical angle θ', directly connecting the other ends of the two lower hanging ropes to the corresponding anchor plates without running through the vertical slits of the corresponding model boxes, or connecting the other ends of the two lower hanging ropes to the corresponding anchor plates after winding around the fixed pulleys and running through the vertical slits;

S8, filling the soil samples into the model boxes, and when the filling height is equal to the pre-embedded depth $h_4$ of the anchor plates, placing the anchor plates into specified positions on the surfaces of the soil samples according to the pre-embedded depth $h_4$ and the pre-embedded horizontal distance $t_{sb}$, and fixing the anchor plates, and then continuing to fill the soil samples into the model boxes until the soil samples are filled to the specified height;

S9, providing transparent front walls for the model boxes, mounting the lateral camera and the laser displacement sensor on each model box, and arranging the front camera directly in front of the front wall of each model box;

S10, starting the winch to load, and turning on the lateral cameras and the front cameras to capture the deformation of the soil samples during the winding process of the winch; and S11, reading, by the force measuring mechanism, a traction force applied by the winch during the test, and calculating pullout forces received by the lower hanging ropes.

2. The measurement method for a pullout force measurement test device based on an anchor group effect of a marine pipeline of claim 1, wherein the two lower hanging ropes are defined as a first lower hanging rope and a second lower hanging rope, respectively, and then a pullout force $F_1$ received by the first lower hanging rope and a pullout force $F_2$ received by the second lower hanging rope are calculated by the following formulae:

in response to the lifting plate remaining horizontal, it is concluded that:

the pullout force $F_1$ received by the first lower hanging rope is:

$$F_1 = \frac{F\cos θ_2}{\sin(θ_1 + θ_2)};$$

the pullout force $F_2$ received by the second lower hanging rope is:

$$F_2 = \frac{F\cos θ_1}{\sin(θ_1 + θ_2)};$$

the first lower hanging rope is on the left side, and the second lower hanging rope is on the right side;

in response to the lifting plate being tilted with left side up and right side down, it is concluded that:

the pullout force received by the first lower hanging rope is:

$$F_1 = \frac{F[\cos α - \sin α \tan(θ_2 - α)]}{\sin(θ_1 - α) + \cos(θ_1 + α)\tan(θ_2 + α)};$$

the pullout force received by the second lower hanging rope is:

$$F_2 = \frac{F[\cos\alpha + \sin\alpha\tan(\theta_1 + \alpha)]}{\sin(\theta_2 - \alpha) + \cos(\theta_2 - \alpha)\tan(\theta_1 + \alpha)};$$

and
in response to the lifting plate being tilted with left side down and right side up, it is concluded that:
the pullout force received by the first lower hanging rope is:

$$F_1 = \frac{F(\cos\alpha + \sin\alpha\tan(\theta_2 + \alpha))}{\sin(\theta_1 - \alpha) + \cos(\theta_1 - \alpha)\tan(\theta_2 + \alpha)};$$

the pullout force received by the second lower hanging rope is:

$$F_2 = \frac{F(\cos\alpha - \sin\alpha\tan(\theta_1 - \alpha))}{\sin(\theta_2 + \alpha) + \cos(\theta_2 + \alpha)\tan(\theta_1 - \alpha)};$$

where $$\alpha = \arcsin\frac{h_1}{L_t};$$

in the above-mentioned formulae:
α is an angle at which the lifting plate is tilted;
F is a measured value of the force measuring mechanism;
$L_t$ is a vertical distance from the lower rope connection points of the lifting plate to the center line of the lifting plate; and
$h_t$ is a projection distance of half of the lifting plate on a plumb line after the lifting plate is tilted;
when the first lower hanging rope does not wind around one fixed pulley, $\theta_1$ is an angle between the first lower hanging rope and the horizontal line; and when the first lower rope winds around the fixed pulley, $\theta_1$ is an angle between the first lower hanging rope, which is located above the fixed pulley, and the horizontal line;
when the second lower hanging rope does not wind around the other fixed pulley, $\theta_2$ is an angle between the second lower hanging rope and the horizontal line; and when the second lower rope winds around the fixed pulley, $\theta_2$ is an angle between the second lower hanging rope, which is located between the fixed pulley and the lifting plate, and the horizontal line;
F is measured by the force measuring mechanism; $L_t$ and $h_t$ are obtained by means of measurement; when the first lower hanging rope does not wind around one fixed pulley, $\theta_1$ is an angle preset according to test needs, and when the first lower hanging rope winds around the fixed pulley, $\theta_1$ is obtained by means of measurement; and when the second lower hanging rope does not wind around the other fixed pulley, $\theta_2$ is an angle preset according to test needs, and when the second lower hanging rope winds around the fixed pulley, $\theta_2$ is obtained by means of measurement.

* * * * *